United States Patent
Akiba et al.

(10) Patent No.: US 11,983,838 B2
(45) Date of Patent: May 14, 2024

(54) CIRCUIT APPARATUS, DISPLAY SYSTEM, AND IMAGE PROCESSING METHOD

(71) Applicant: Seiko Epson Corporation, Tokyo (JP)

(72) Inventors: Yasutoshi Akiba, Chino (JP); Kumar Anandabairavasamy Anand, Richmond (CA); Jeffrey Eric, Richmond (CA)

(73) Assignee: SEIKO EPSON CORPORATION (JP)

( * ) Notice: Subject to any disclaimer, the term of this patent is extended or adjusted under 35 U.S.C. 154(b) by 288 days.

(21) Appl. No.: 17/486,996

(22) Filed: Sep. 28, 2021

(65) Prior Publication Data

US 2022/0101487 A1 Mar. 31, 2022

(30) Foreign Application Priority Data

Sep. 30, 2020 (JP) ................................ 2020-164508

(51) Int. Cl.
  *G06T 3/00* (2006.01)
  *G02B 27/01* (2006.01)
  *G06T 5/00* (2006.01)
  *G06T 5/50* (2006.01)

(52) U.S. Cl.
  CPC ........ *G06T 3/0093* (2013.01); *G02B 27/0101* (2013.01); *G06T 5/006* (2013.01); *G06T 5/50* (2013.01); *G02B 2027/014* (2013.01); *G06T 2207/20221* (2013.01)

(58) Field of Classification Search
  None
  See application file for complete search history.

(56) References Cited

U.S. PATENT DOCUMENTS

| 2014/0293113 | A1* | 10/2014 | Niemi .................. H04N 23/631 348/333.11 |
| 2017/0169612 | A1* | 6/2017 | Cashen ................ G06T 19/006 |
| 2018/0316865 | A1 | 11/2018 | Wakamatsu |

(Continued)

FOREIGN PATENT DOCUMENTS

| JP | 2009-179214 A | 8/2009 |
| JP | 2017-013590 A | 1/2017 |

(Continued)

OTHER PUBLICATIONS

Hiroyuki Aga, et al., "Latency Compensation for Optical See-Through Head-Mounted With Scanned Display", Sony Corporation, SID Symposium Digest of Technology, 2019, 24-2, pp. 330-333, Tokyo, Japan.

*Primary Examiner* — Jwalant Amin
(74) *Attorney, Agent, or Firm* — Harness, Dickey & Pierce, P.L.C.

(57) ABSTRACT

A circuit apparatus includes a memory unit and a warp processing unit. The memory unit stores a warp object image. The warp processing unit performs warp processing on the warp object image and generates a display image displayed in a display area. The warp processing unit performs the warp processing on an image of a first view object of the warp object image based on a first warp parameter for vibration correction and distortion correction. Further, the warp processing unit performs the warp processing on an image of a second view object of the warp object image based on a second warp parameter for the distortion correction.

10 Claims, 15 Drawing Sheets

(56) References Cited

U.S. PATENT DOCUMENTS

| | | |
|---|---|---|
| 2019/0333481 A1 | 10/2019 | Hato et al. |
| 2019/0385571 A1* | 12/2019 | Nagasawa ................. G09G 3/20 |
| 2020/0012103 A1 | 1/2020 | Kasazumi et al. |
| 2020/0269696 A1 | 8/2020 | Banno et al. |
| 2021/0019867 A1* | 1/2021 | Hayashi ............... H04N 9/3185 |

FOREIGN PATENT DOCUMENTS

| | | |
|---|---|---|
| JP | 2017-094882 A | 6/2017 |
| JP | 2018-140714 A | 9/2018 |
| JP | 2018-172088 A | 11/2018 |
| JP | 2019-098755 A | 6/2019 |
| JP | 2019-164318 A | 9/2019 |
| JP | 2020-050328 A | 4/2020 |

* cited by examiner

FIG. 13

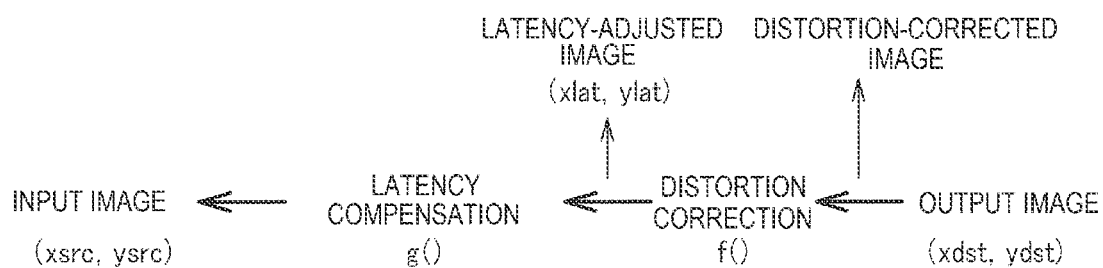

INPUT IMAGE ← LATENCY COMPENSATION ← DISTORTION CORRECTION ← OUTPUT IMAGE
(xsrc, ysrc)           g()                       f()                (xdst, ydst)

↑ LATENCY-ADJUSTED      ↑ DISTORTION-CORRECTED
                       IMAGE                    IMAGE
                       (xlat, ylat)

FIG. 14

| DISPLACEMENT | COMPENSATION METHOD |
|---|---|
| YAW $\Delta \alpha$ | HORIZONTAL SHIFTING |
| PITCH $\Delta \beta$ | PERPENDICULAR SHIFTING |
| ROLL $\Delta \gamma$ | ROTATING |
| HORIZONTAL SHIFT $\Delta x$ | HORIZONTAL SHIFTING |
| PERPENDICULAR SHIFT $\Delta y$ | PERPENDICULAR SHIFTING |
| ANTERIOR OR POSTERIOR SHIFT $\Delta z$ | REDUCING OR ZOOMING |

*FIG. 15*

$$\begin{bmatrix} xsrc \\ ysrc \\ 1 \end{bmatrix} = \begin{bmatrix} m11 & m12 & m13 \\ 0 & m22 & m23 \\ 0 & 0 & 1 \end{bmatrix} \begin{bmatrix} xlat \\ ylat \\ 1 \end{bmatrix}$$

- m11: HORIZONTAL SCALE
- m12: HORIZONTAL SKEW
- m13: HORIZONTAL SHIFT
- m22: PERPENDICULAR SCALE
- m23: PERPENDICULAR SHIFT

CIRCUIT APPARATUS, DISPLAY SYSTEM, AND IMAGE PROCESSING METHOD

The present application is based on, and claims priority from JP Application Serial Number 2020-164508, filed Sep. 30, 2020, the disclosure of which is hereby incorporated by reference herein in its entirety.

BACKGROUND

1. Technical Field

The present disclosure relates to a circuit apparatus, a display system, an image processing method, etc.

2. Related Art

A head-up display that displays an image on a transparent screen or the like with information superimposed on a field of view of a user is known. The head-up display and an AR technique are combined, and thereby, a virtual object may be displayed to track a real object such as a car ahead or a road on the head-up display. AR is an abbreviation for Augmented Reality.

While vibration correction is performed for the AR virtual object to track the real object, fixed views of meters etc., which are not required to track the real object, may be desired. Further, in the head-up display, the image is distorted due to a curved surface of the transparent screen or the like, and distortion correction for correcting the distortion is performed. JP-A-2020-050328 discloses a technique of synthesizing an image requiring vibration correction and an image not requiring vibration correction on a frame memory and correcting distortion of the synthesized image. Further, JP-A-2009-179214 discloses a technique of separately performing position correction and distortion correction and changing a parameter for the distortion correction with respect to each image area in the distortion correction. Furthermore, JP-A-2017-94882 discloses a technique of synthesizing a plurality of pictures including a first picture with position correction and a second picture without position correction, however, the first picture and the second picture are separate pictures.

In view of accurate correction of a position difference of the AR virtual object relative to the real object, it is desirable that the time of vibration correction is close to the time of display on the head-up display. However, in JP-A-2020-050328 and JP-A-2009-179214, distortion correction is performed after vibration correction or position correction, and the processing time from the vibration correction or position correction to output to the head-up display is longer. In JP-A-2017-94882, a plurality of different pictures are corrected and synthesized, and the processing time from position correction to output to the head-up display is longer. As described above, in related art, in the HUD in which an AR view and a fixed view are mixed, there is a problem that the processing time from the vibration correction or position correction to output to the head-up display is longer and correction of the position difference is insufficient.

SUMMARY

An aspect of the present disclosure relates to a circuit apparatus used for a head-up display that displays a first view object corresponding to a real object in a real space and a second view object in a display area, including a memory unit that stores a warp object image containing an image of the first view object and an image of the second view object, and a warp processing unit that performs warp processing on the warp object image and generates a display image displayed in the display area, wherein the warp processing unit performs the warp processing on the image of the first view object of the warp object image based on a first warp parameter for vibration correction of a display position difference of the first view object relative to the real object and distortion correction according to at least one of curvature of the display area and distortion in an optical system, and performs the warp processing on the image of the second view object of the warp object image based on a second warp parameter for the distortion correction.

Another aspect of the present disclosure relates to a display system of a head-up display that displays a first view object corresponding to a real object in a real space and a second view object in a display area, including a memory unit that stores a warp object image containing an image of the first view object and an image of the second view object, and a warp processing unit that performs warp processing on the warp object image and generates a display image displayed in the display area, wherein the warp processing unit performs the warp processing on the image of the first view object of the warp object image based on a first warp parameter for vibration correction of a display position difference of the first view object relative to the real object and distortion correction according to at least one of curvature of the display area and distortion in an optical system, and performs the warp processing on the image of the second view object of the warp object image based on a second warp parameter for the distortion correction.

Yet another aspect of the present disclosure relates to an image processing method for a head-up display that displays a first view object corresponding to a real object in a real space and a second view object in a display area, including performing warp processing on a warp object image containing an image of the first view object and an image of the second view object and generating a display image displayed in the display area, performing the warp processing on the image of the first view object of the warp object image based on a first warp parameter for vibration correction of a display position difference of the first view object relative to the real object and distortion correction according to at least one of curvature of the display area and distortion in an optical system, and performing the warp processing on the image of the second view object of the warp object image based on a second warp parameter for the distortion correction.

BRIEF DESCRIPTION OF THE DRAWINGS

FIG. 13 is an explanatory diagram of warp processing.

FIG. 14 shows correlations between tracking information of a vehicle or the like and latency compensation based on the tracking information.

FIG. 15 shows examples of latency compensation parameters.

DESCRIPTION OF EXEMPLARY EMBODIMENTS

As below, preferred embodiments of the present disclosure will be explained in detail. The following embodiments do not unduly limit the details described in the appended claims and not all configurations explained in the embodiments are essential component elements.

1. First Configuration Example

Figure 1:
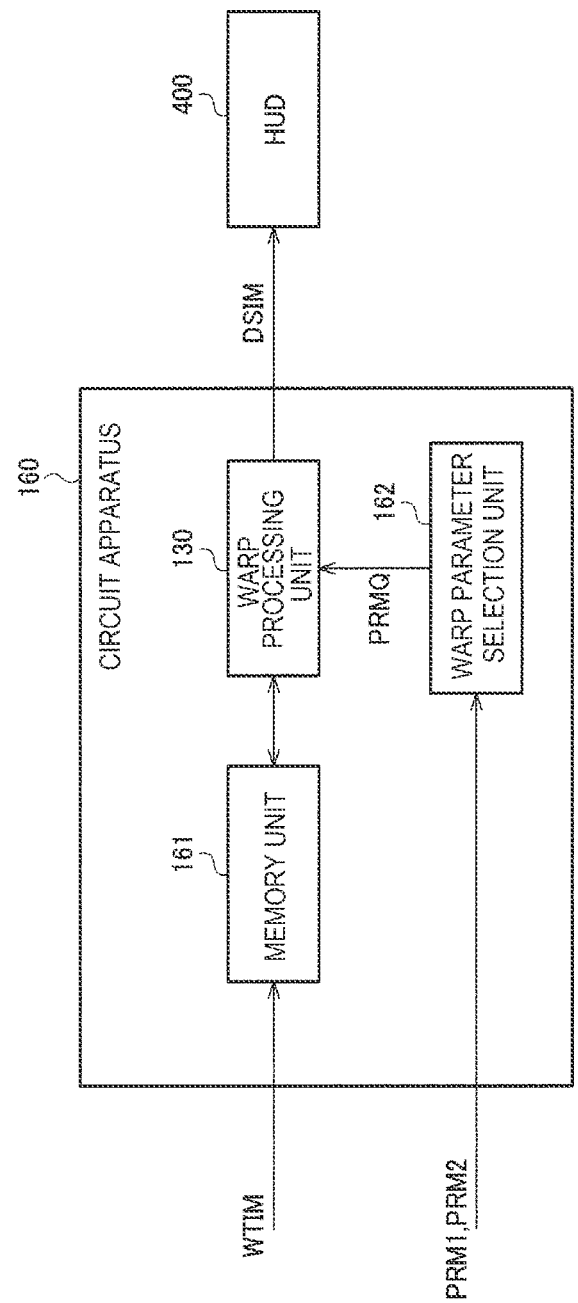
FIG. 1 shows a first configuration example of a circuit apparatus.

FIG. 1 shows a first configuration example of a circuit apparatus 160 used for an HUD. HUD is an abbreviation for head-up display. The circuit apparatus 160 includes a memory unit 161, a warp processing unit 130, and a warp parameter selection unit 162. The circuit apparatus 160 is also called an HUD controller and includes e.g. an integrated circuit apparatus with circuits integrated on a semiconductor substrate.

The memory unit 161 temporarily stores a warp object image WTIM input to the circuit apparatus 160. Specifically, the memory unit 161 is a line buffer that stores image data for a number of lines necessary for warp processing. The number of lines may be a sum of the number of movement lines in perpendicular directions in warp processing and some margin. The memory unit 161 is e.g. a semiconductor memory such as a RAM. RAM is an abbreviation for Random Access Memory.

The warp processing unit 130 generates a display image DSIM by performing warp processing on the warp object image WTIM and outputs the display image DSIM to an HUD 400. The warp processing is coordinate transform between the warp object image WTIM and the display image DSIM, and includes distortion correction and vibration correction in the embodiment. As will be described later, the warp processing unit 130 performs distortion correction and vibration correction on an image area corresponding to an AR view and performs only distortion correction on an image area corresponding to a fixed view. AR is an abbreviation for augmented reality. The distortion correction and the vibration correction are collectively executed by coordinate transform of the warp processing. That is, a warp parameter expressing coordinate transform includes a parameter for distortion correction and a parameter for vibration correction, and the distortion correction and the vibration correction are executed at the same time by coordinate transform using the warp parameter.

The warp processing unit 130 may be a forward warp engine or an inverse warp engine. Forward warp is conversion of moving respective pixels of an input image to the warp engine to arbitrary positions in an output image. The forward warp engine is a warp engine having a function of forward warp. Inverse warp is conversion of obtaining respective pixels of an output image of the warp engine from pixels in arbitrary positions in an input image. The inverse warp engine is a warp engine having a function of inverse warp.

The warp parameter selection unit 162 selects a first warp parameter PRM1 when the image area corresponding to the AR view is warp-processed and selects a second warp parameter PRM2 when the image area corresponding to the fixed view is warp-processed. The selected parameters are output as a warp parameter PRMQ to the warp processing unit 130. The first warp parameter PRM1 is a warp parameter for both the distortion correction and the vibration correction. The second warp parameter PRM2 is a warp parameter for the distortion correction, but not for the vibration correction. The warp processing unit 130 performs the distortion correction and the vibration correction on the image area corresponding to the AR view and performs only the distortion correction on the image area corresponding to the fixed view by performing warp processing using the warp parameter PRMQ output by the warp parameter selection unit 162. Note that the first warp parameter PRM1 and the second warp parameter PRM2 are externally input to the circuit apparatus 160. Or, the circuit apparatus 160 may include a parameter calculation unit that generates the first warp parameter PRM1 and the second warp parameter PRM2.

Figure 2:
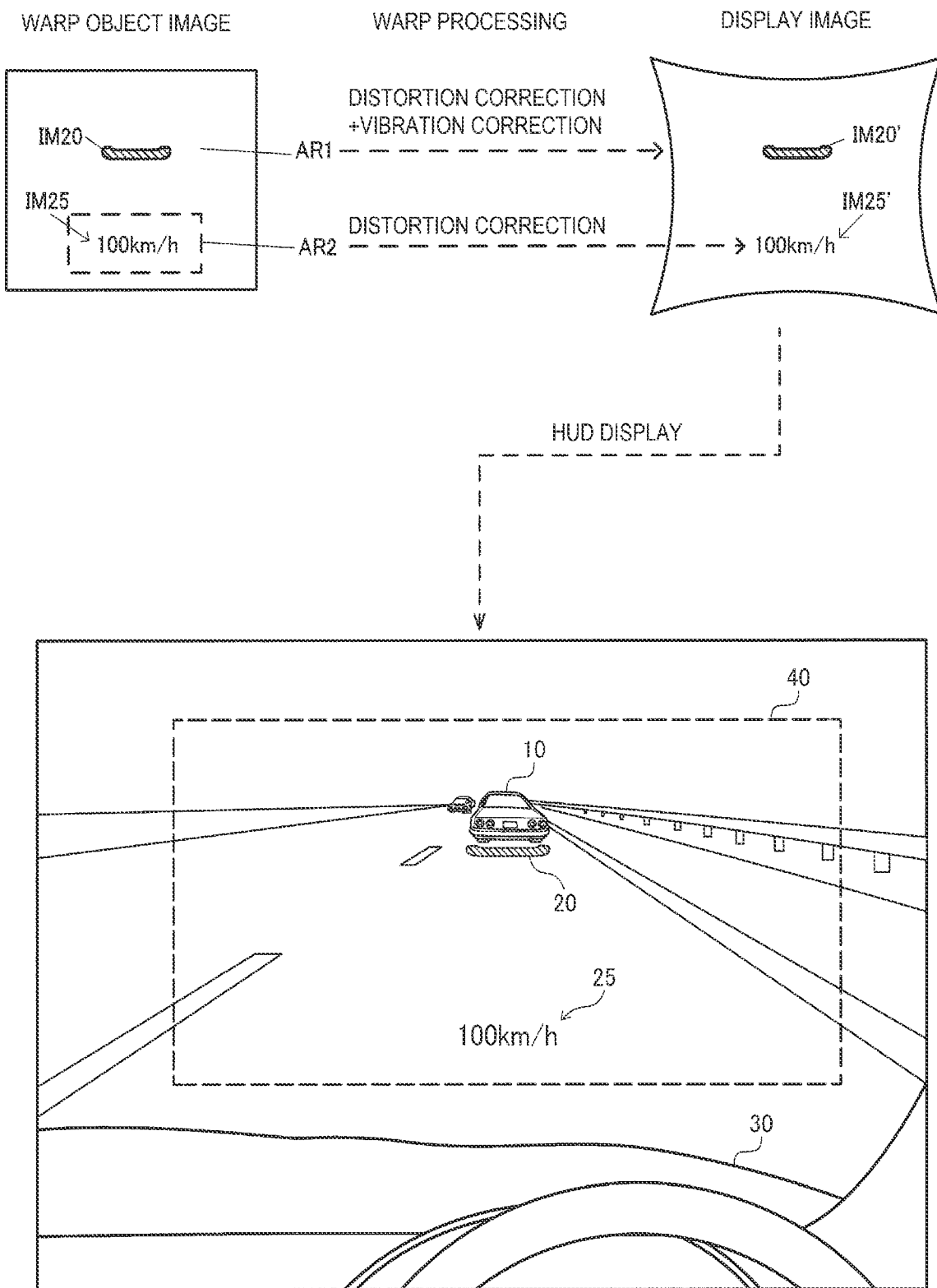
FIG. 2 is an explanatory diagram of processing performed by the first configuration example of the circuit apparatus.

FIG. 2 is an explanatory diagram of processing performed by the first configuration example of the circuit apparatus 160. In FIG. 2, an example in which the HUD is provided in an automobile 30 is mainly explained, however, the HUD of the embodiment may be provided in various vehicles including aircrafts, vessels, or two wheels.

As shown in the left part of FIG. 2, the warp object image contains an image IM20 of a first view object and an image IM25 of a second view object. The images IM20 and IM25 refer to a part of the warp object image, but not refer to another image than the warp object image.

Here, the first view object is a view object in the AR view, i.e., a virtual object displayed to track a real object in a real space in the HUD. In the lower part of FIG. 2, a car ahead 10 is a real object and a first view object 20 is displayed to track the car ahead 10. The image IM20 of the first view object is an image for display of the first view object 20 in the HUD. In the left part of FIG. 2, a hatched figure part is the image IM20.

The second view object is a view object not tracking a real object in the HUD, and located in a display position fixed in the display image DSIM output from the circuit apparatus 160 to the HUD 400. When a position relationship between a viewer viewing the HUD and the HUD does not change, the display position of the second view object is fixed in a field of view of the viewer. In the left part of FIG. 2, characters "100 km/h" in the fixed view is a second view object 25. The image IM25 of the second view object is an image for display of the second view object 25 in the HUD. In the left part of FIG. 2, a character part of "100 km/h" is the image IM25.

The warp object image corresponds to an input image in the warp processing of coordinate transform between an input image and an output image. Specifically, the warp object image is an image input from the memory unit 161 to the warp processing unit 130 and containing the above described image IM20 of the first view object and image IM25 of the second view object. For example, rendering processing of the AR view is performed in a processing unit outside of the circuit apparatus 160 and a rendering image thereof is input to the circuit apparatus 160. In the rendering image, at least the image IM20 of the first view object is rendered. For example, in the rendering processing, the image IM25 of the second view object is also rendered and the rendering image is stored as the warp object image in the memory unit 161. Or, the circuit apparatus 160 may include an overlay processing unit (not shown) and the overlay processing unit may overlay the image IM25 of the second view object on the rendering image and store the image as the warp object image in the memory unit 161.

Note that the warp object image is not limited to the rendering image. For example, a plurality of images in which the image IM20 of the first view object is placed in various display positions may be prepared in advance and the image selected from the plurality of images may be input as the warp object image to the circuit apparatus 160. In this case, the image corresponding to the position in which the first view object should be displayed in the AR view is selected from the plurality of images.

As shown in the left part and middle part of FIG. 2, the warp processing unit 130 performs the distortion correction and the vibration correction on a first area AR1 of the warp object image, and performs the distortion correction, but does not perform the vibration correction on a second area AR2 of the warp object image. Thereby, a distortion that cancels out the distortion generated in the HUD 400 is provided to the display image. Further, the display image contains a distortion-corrected and vibration-corrected image IM20' of the first view object and a distortion-corrected image IM25' of the second view object.

Specifically, the warp parameter selection unit 162 selects the first warp parameter PRM1 when the warp processing of the first area AR1 is performed, and the warp parameter selection unit 162 selects the second warp parameter PRM2 when the warp processing of the second area AR2 is performed. Thereby, correction with respect to each of the areas is realized. The warp parameter selection unit 162 may determine the first area AR1 or the second area AR2 from the coordinates of the pixels warp-processed by the warp processing unit 130. In the forward warp, whether the pixels of the warp object image at the input side belong to the first area AR1 or the second area AR2 is determined. In the inverse warp, whether the pixels of the display image at the output side correspond to the first area AR1 or the second area AR2 is determined. The warp object image and the display image are correlated by the distortion correction and the area can be determined from the correlation.

Here, the first area AR1 is an area containing the image IM20 of the first view object, but not containing the image IM25 of the second view object in the warp object image. Specifically, the first area AR1 is the other area than the second area AR2 in the warp object image. Note that, when the warp object image contains an image of a third view object and the third view object is for an AR view, the first area AR1 is set to contain the image IM20 of the first view object and the image of the third view object.

The second area AR2 is an area containing the image IM25 of the second view object in the warp object image. Specifically, the second area AR2 is an area containing the whole image IM25 of the second view object in the warp object image. Note that, when the warp object image contains an image of a third view object and the third view object is for a fixed view, the second area AR2 is set to contain the image IM25 of the second view object and the image of the third view object.

Note that the first area AR1 and the second area AR2 may be defined in the display image. In this case, the first area AR1 contains the distortion-corrected and vibration-corrected image IM20' of the first view object and the second area AR2 contains the distortion-corrected image IM25' of the second view object. As described above, the warp object image and the display image are correlated by the distortion correction, and the second area AR2 can be set to contain the image IM25' of the second view object and the other area than the second area AR2 may be the first area AR1.

The distortion correction is processing of coordinate transform of the warp object image according to the curvature of the display area or/and the distortion in an optical system. The coordinate transform is coordinate transform to cancel out the image distortion due to curvature of the screen. The display image is an image displayed on the display panel of the HUD 400 and the display image displayed on the display panel is projected on the screen by a projection unit, and thereby, displayed in the field of view of the viewer as a virtual image without distortion.

The vibration correction is processing of correcting the display position difference of the first view object displayed to track the real object in the AR view. The display position difference is generated due to a change in position or attitude of the vehicle provided with the HUD, and the vibration correction is performed according to the change in position or attitude of the vehicle. In the lower part of FIG. 2, the automobile 30 is the vehicle and a position difference of the first view object 20 relative to the car ahead 10 is generated due to the change in position or attitude of the automobile 30.

The vibration correction includes shift correction. Further, the vibration correction may further include rotation correction, scale correction, or both. A shift refers to a position difference of the first view object 20 relative to the car ahead 10 in horizontal directions or perpendicular directions. The shift correction is correction of moving the first area AR1 of the warp object image in the horizontal directions or perpendicular directions in order to cancel out the shift. A rotation refers to a rotation of the first view object 20 relative to the car ahead 10 clockwise or counterclockwise. The rotation correction is correction of rotating the first area AR1 of the warp object image clockwise or counterclockwise in order to cancel out the rotation. A scale refers to enlargement or reduction of the size of the first view object 20 relative to the car ahead 10. The scale correction is correction of enlarging or reducing the first area AR1 of the warp object image in order to correct the scale.

The vibration correction is e.g. latency compensation, which will be described later. The latency compensation is to compensate for the display position difference generated from the time when the rendering image is rendered to the time the warp processing is performed. Specifically, the difference between the display position of the first view object determined or predicted from the tracking information at the time of rendering and the display position of the first view object determined from the tracking information at the time of warp processing is compensated. The tracking information is acquired from a sensor and the details thereof will be described later. Note that the vibration correction is not limited to the latency compensation, but may be processing of correcting the change in position or attitude of the vehicle that is not sufficiently tracked by rendering. That is, without using the difference, for example, a low-frequency component of the tracking information may be used in rendering and a high-frequency component of the tracking information may be used in the vibration correction of the warp processing.

As shown in the middle part and the right part of FIG. 2, the warp processing unit 130 outputs the display image to the HUD 400. The HUD 400 projects the display image on the screen and the viewer views the screen, and thereby, the display image as the virtual image superimposed on the real space is seen from the viewer. In the lower part of FIG. 2, an AR view that a driver as the viewer views via the HUD 400 is shown. The driver views the car ahead 10, a road on which the car ahead 10 is traveling, and a surrounding landscape through the windshield. Further, the driver views the virtual image projected within a display area 40 of the windshield by the HUD 400. The display area 40 shows a range in which the HUD 400 can project the virtual image.

The virtual image contains the first view object and the second view object 25. Specifically, in the display image in the right part of FIG. 2, the other parts than the image IM20' of the first view object and the image IM25' of the second view object are in black transparently displayed in the HUD 400. Of the display image projected by the HUD 400, the first view object 20 is projected by the image IM20' of the first view object and the second view object 25 is projected by the image IM25' of the second view object. In the virtual image, the other parts than the view objects are transparent and only the view objects appear to overlap on the real space from the viewer. Here, the whole virtual image generated by the HUD 400 is referred to as "virtual image" and the parts not transparent and recognized by the viewer are referred to as "view objects". Note that the background of the view objects is not necessarily transparent and, when the background is not transparent, specific parts of the virtual image may be referred to as "view objects".

Of the virtual image projected by the HUD 400, the first view object 20 is vibration-corrected and accurately tracks the car ahead 10 compared to a case without vibration correction. Further, the second view object 25 is not vibration-corrected and fixedly displayed in the field of view of the viewer and easily viewable without being affected by the change in position or attitude of the automobile 30.

In the above described embodiment, the circuit apparatus 160 is used for the HUD 400 that displays the first view object 20 corresponding to the real object in the real space and the second view object 25 in the display area 40. The circuit apparatus 160 includes the memory unit 161 and the warp processing unit 130. The memory unit 161 stores the warp object image WTIM containing the image IM20 of the first view object and the image IM25 of the second view object. The warp processing unit 130 performs the warp processing on the warp object image WTIM and generates the display image DSIM to be displayed in the display area 40. The warp processing unit 130 performs the warp processing on the image IM20 of the first view object of the warp object image WTIM based on the first warp parameter PRM1. The first warp parameter PRM1 is the warp parameter for the vibration correction of the display position difference of the first view object 20 relative to the real object and the distortion correction according to the curvature of the display area 40. Further, the warp processing unit 130 performs the warp processing on the image IM25 of the second view object of the warp object image WTIM based on the second warp parameter PRM2. The second warp parameter PRM2 is the warp parameter for the distortion correction.

According to the configuration, the vibration correction is performed on the first view object 20 tracking the real object and the vibration correction is not performed on the second view object 25 not tracking the real object. Thereby, the AR view may be realized and the view objects not for the AR view may be fixedly displayed in the field of view of the viewer of the HUD. Further, according to the embodiment, the vibration correction is performed with the distortion correction in the warp processing, and the vibration correction is executed at the time of the warp processing close to the HUD display time. Thereby, compared to related art with the longer processing time from vibration correction to display like the above described JP-A-2020-050328, JP-A-2009-179214, and JP-A-2017-94882, the display position difference of the first view object 20 relative to the real object may be accurately corrected.

Furthermore, in the embodiment, the circuit apparatus 160 includes the warp parameter selection unit 162. When the warp processing unit 130 performs the warp processing on the first area AR1 in which the first view object 20 is displayed, the warp parameter selection unit 162 outputs the first warp parameter PRM1 to the warp processing unit 130. Or, when the warp processing unit 130 performs the warp processing on the second area AR2 in which the second view object 25 is displayed, the warp parameter selection unit 162 outputs the second warp parameter PRM2 to the warp processing unit 130.

According to the configuration, the warp processing using the first warp parameter PRM1 is performed on the first area AR1, and thereby, the distortion correction and the vibration correction are performed on the image IM20 of the first view object. Further, the warp processing using the second warp parameter PRM2 is performed on the second area AR2, and thereby, the distortion correction is performed on the image IM25 of the second view object and the vibration correction is not.

In the embodiment, the memory unit 161 is a line buffer. The warp processing is performed, for example, with respect to each line or several lines. Accordingly, it is only necessary for the memory unit 161 to store image data for the number of lines necessary for the warp processing of one line or several lines of the warp object image. Accordingly, the memory unit 161 may be the line buffer, not a frame memory.

Note that the operation of the above described circuit apparatus 160 may be executed as an image processing method for the HUD as below. In this case, the subject of the respective steps is not limited to the circuit apparatus 160. For example, the display system of the HUD, which will be described later, may be the subject of the respective steps.

The image processing method is an image processing method for the head-up display that displays the first view object 20 corresponding to the real object in the real space and the second view object 25 in the display area 40. The image processing method is to perform the warp processing on the warp object image WTIM containing the image IM20 of the first view object and the image IM25 of the second view object and generates the display image DSIM displayed in the display area 40. The image processing method is to perform the warp processing on the image IM20 of the first view object of the warp object image WTIM based on the first warp parameter PRM1 for the vibration correction of the display position difference of the first view object 20 relative to the real object and the distortion correction according to the curvature of the display area 40. The image processing method is to perform the warp processing on the image IM25 of the second view object of the warp object image WTIM based on the second warp parameter PRM2 for the distortion correction.

2. Second Configuration Example

Figure 3:
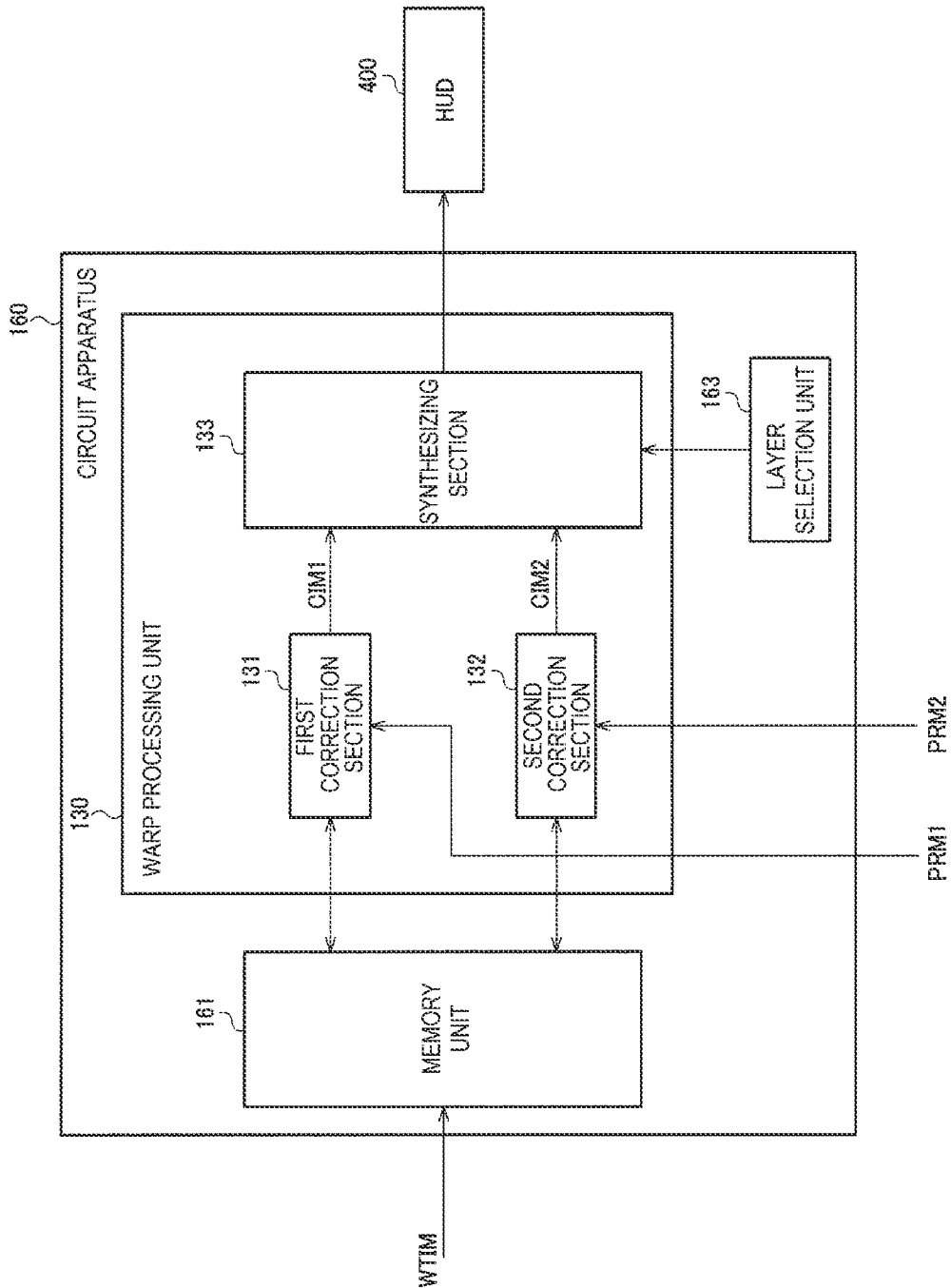
FIG. 3 shows a second configuration example of the circuit apparatus.

FIG. 3 shows a second configuration example of the circuit apparatus 160. The circuit apparatus 160 includes the memory unit 161, the warp processing unit 130, and a layer selection unit 163. The warp processing unit 130 includes a first correction section 131, a second correction section 132, and a synthesizing section 133. Note that the explanation of the same configurations and operations as those of the first configuration example will be appropriately omitted.

Figure 4:
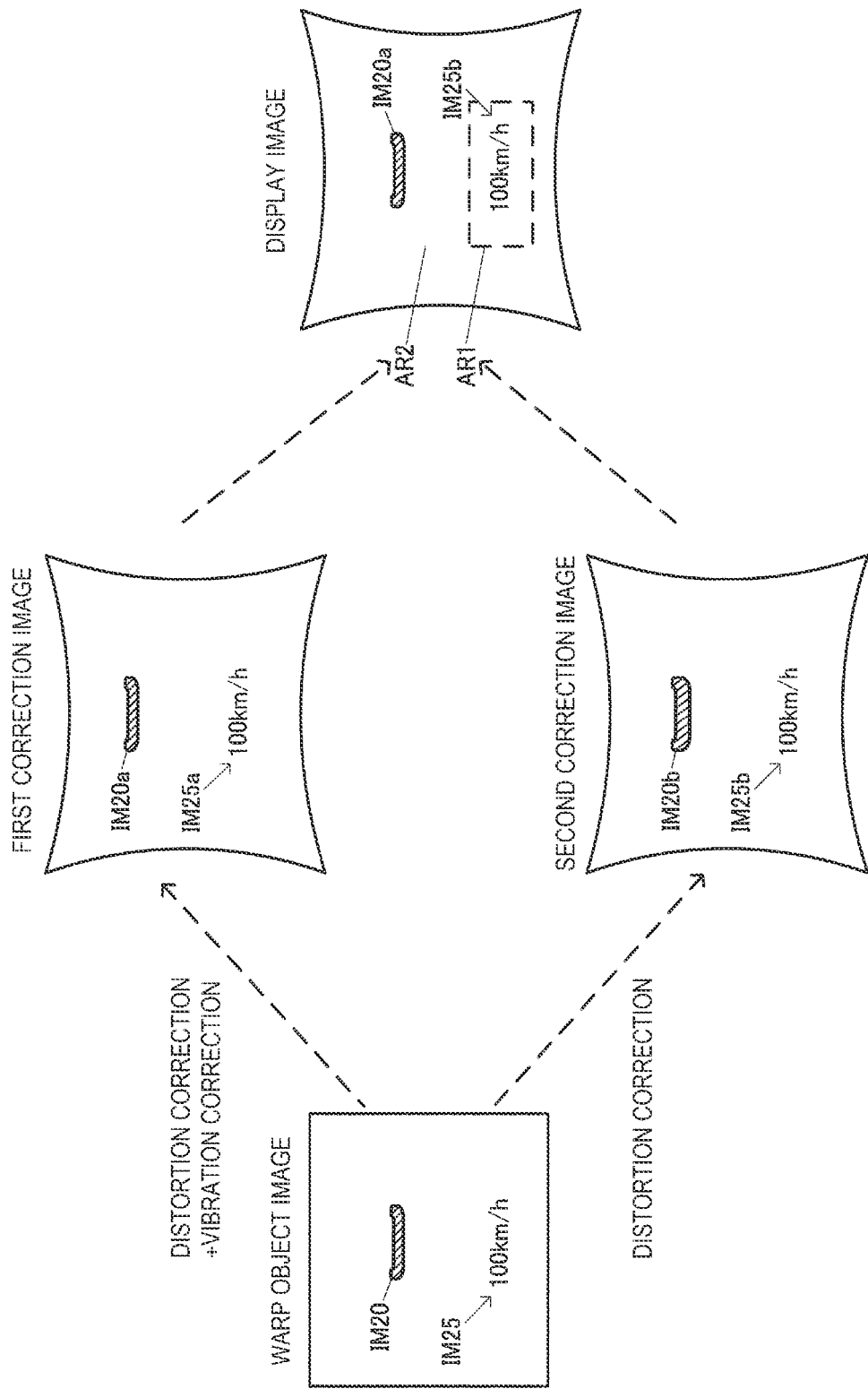
FIG. 4 is an explanatory diagram of processing performed by the second configuration example of the circuit apparatus.

FIG. 4 is an explanatory diagram of processing performed in the second configuration example of the circuit apparatus 160. Note that the operation after the display image is output to the HUD is the same as that of the first configuration example.

As shown in the left part and the middle part of FIG. 4, the first correction section 131 generates a first correction image CIM1 by performing warp processing using the first warp parameter PRM1 on the warp object image WTIM. The warp processing is performed on the whole warp object image WTIM. That is, the first correction image CIM1 refers to an image formed by distortion correction and vibration correction of the whole warp object image WTIM. The first correction image CIM1 contains a distortion-corrected and vibration-corrected image IM20a of the first view object and a distortion-corrected and vibration-corrected image IM25a of the second view object.

The second correction section 132 generates a second correction image CIM2 by performing warp processing using the second warp parameter PRM2 on the warp object image WTIM. The warp processing is performed on the whole warp object image WTIM. That is, the second correction image CIM2 refers to an image formed by distortion correction of the whole warp object image WTIM. The second correction image CIM2 contains a distortion-corrected image IM20b of the first view object and a distortion-corrected image IM25b of the second view object.

The first correction section 131 and the second correction section 132 are respectively separate warp engines. That is, the warp processing by the first correction section 131 and the warp processing by the second correction section 132 are processed in parallel by the respective warp engines. The warp engine may be a forward warp engine or an inverse warp engine.

As shown in the middle part and the right part of FIG. 4, the synthesizing section 133 generates a display image DSIM by synthesizing the first correction image CIM1 and the second correction image CIM2. Here, the first area AR1 and the second area AR2 are defined in the display image DSIM. The synthesizing section 133 selects the first correction image CIM1 in the first area AR1 and selects the second correction image CIM2 in the second area AR2. Thereby, as shown in the right part of FIG. 4, the display image DSIM containing the distortion-corrected and vibration-corrected image IM20a of the first view object and the distortion-corrected, but not vibration-corrected image IM25b of the second view object is output. Information designating the first area AR1 and the second area AR2 is input from the layer selection unit 163 to the synthesizing section 133 and the synthesizing section 133 performs the above described selection based on the information.

Or, the synthesizing section 133 may perform synthesis by a blending. That is, the synthesizing section 133 blends the pixel values of the respective pixels within the first area AR1 using $\alpha 1$ as a blending rate of the first correction image CIM1 and $1-\alpha 1$ as a blending rate of the second correction image CIM2 in the first area AR1. Further, the synthesizing section 133 blends the pixel values of the respective pixels within the second area AR2 using $1-\alpha 2$ as a blending rate of the first correction image CIM1 and $\alpha 2$ as a blending rate of the second correction image CIM2 in the second area AR2. For example, when $\alpha 1=\alpha 2=1$, the synthesis is the same as that in the above described selection. The information designating the first area AR1 and the second area AR2 is input from the layer selection unit 163 to the synthesizing section 133 and the synthesizing section 133 performs the $\alpha$ blending based on the information.

Note that "synthesis" here is not a synthesis with a significant delay such that one whole frame is synthesized on a frame memory at a time. In the above description, the examples of the synthesis include selection and a blending. More specifically, the first correction section 131 and the second correction section 132 perform warp processing on one line at a time and output a result for one line at a time. In this regard, the synthesizing section 133 performs selection or $\alpha$ blending on one line at a time and outputs a display image for one line at a time. Note that the processing may be performed with respect to several lines, and the number of lines is smaller than the number of lines of one frame.

In the above described embodiment, the warp processing unit 130 includes the first correction section 131, the second correction section 132, and the synthesizing section 133. The first correction section 131 performs warp processing on the warp object image WTIM based on the first warp parameter PRM1 and outputs the first correction image CIM1. The second correction section 132 performs warp processing on the warp object image WTIM based on the second warp parameter PRM2 and outputs the second correction image CIM2. The synthesizing section 133 synthesizes the first correction image CIM1 and the second correction image CIM2 and outputs the display image DSIM.

According to the configuration, parallel processing of the distortion correction and the vibration correction by the first correction section 131 and the distortion correction by the second correction section 132 can be performed. Further, the synthesizing section 133 synthesizes the first correction image CIM1 obtained by the distortion correction and the vibration correction and the second correction image CIM2 obtained by the distortion correction, and thereby, the display image DSIM in which the vibration-corrected area and the non-vibration-corrected area are mixed may be generated.

In the embodiment, the synthesizing section 133 outputs the first correction image CIM1 as the display image DSIM with respect to the first area AR1 in which the first view object 20 is displayed. Further, the synthesizing section 133 outputs the second correction image CIM2 as the display image DSIM with respect to the second area AR2 in which the second view object 25 is displayed.

According to the configuration, the distortion-corrected and vibration-corrected first area AR1 and the distortion-corrected, but not vibration-corrected second area AR2 are synthesized and output as the display image DSIM. Thereby, the first view object 20 for the AR view is vibration-corrected and the second view object 25 for the fixed view is not vibration-corrected. Further, the synthesis is performed by selection of the areas and, compared to related art of synthesizing in units of frames on the frame memory or the like, the processing time from the vibration correction to the HUD display is shorter. Thereby, the display position difference may be made smaller.

In the embodiment, the synthesizing section 133 performs α blending of the first correction image CIM1 and the second correction image CIM2 and outputs the display image DSIM.

According to the configuration, the distortion-corrected and vibration-corrected first correction image CIM1 and the distortion-corrected, but not vibration-corrected second correction image CIM2 are α-blended. Thereby, the display image DSIM containing the distortion-corrected and vibration-corrected first view object 20 and the distortion-corrected, but not vibration-corrected second view object 25 is generated. Further, the synthesis is performed by a blending and, compared to related art of synthesizing in units of frames on the frame memory or the like, the processing time from the vibration correction to the HUD display is shorter. Thereby, the display position difference may be made smaller.

3. Display System

As below, the display system including the circuit apparatus 160 will be explained. Here, a case where the vibration correction is latency compensation is explained as an example, however, as described above, the vibration correction is not limited to the latency compensation. Further, the first view object as the object of the vibration correction is mainly explained, however, as described above, the second view object for the fixed view is also displayed on the HUD. Hereinafter, the first view object is referred to as "virtual object". As described above, the virtual object refers to the object displayed to track the real object in the real space in the HUD.

As shown in the lower part of FIG. 2, the display system of the HUD provided in the automobile 30 tracks the car ahead 10 or the like using a sensor such as a Lidar, renders the virtual object 20 based on the tracking result, and warp-processes and displays the rendering image on the HUD. In this regard, there is a delay due to tracking processing, rendering processing, warp processing, data communications, or the like between the time when the sensor samples and the time when the virtual object 20 is displayed on the HUD. The delay generated by the processing, communications, or the like is called latency.

The latency causes a position difference of the virtual object 20 relative to the car ahead 10 or the like. That is, due to the difference between the position of the car ahead 10 or the like when the display system renders the virtual object 20 and the position of the car ahead 10 or the like when the virtual object 20 is actually displayed on the HUD, the virtual object 20 is displayed with a difference relative to the car ahead 10 or the like. For example, in the rendering processing, if the position of the car ahead 10 or the like is predicted at a display time in the future, the predicted position of the car ahead 10 or the like and the position of the car ahead 10 or the like when the virtual object 20 is actually displayed on the HUD may be different because time elapses from the prediction time to the display.

Figure 5:
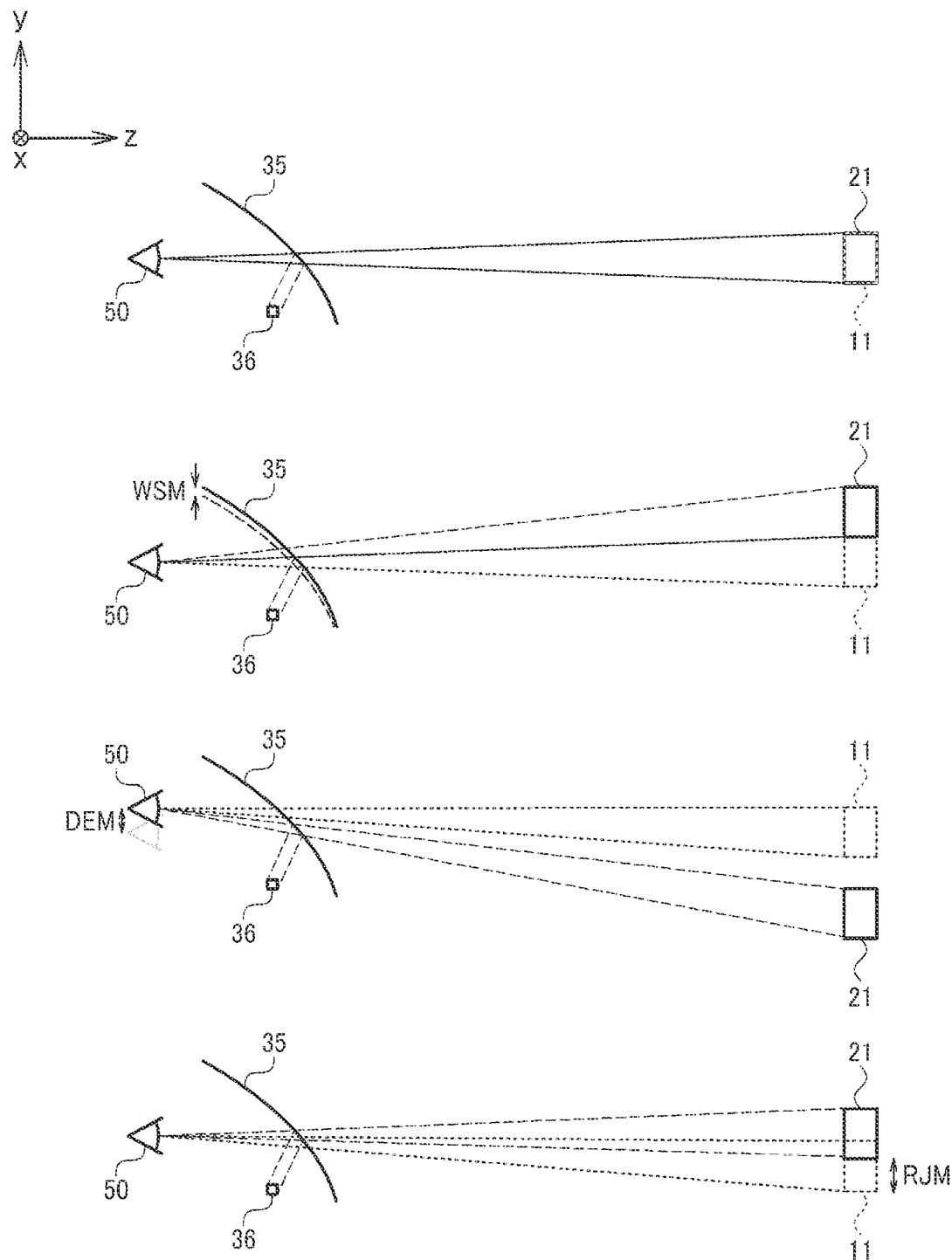
FIG. 5 is an explanatory diagram of display position differences due to pitch displacement or perpendicular displacement.

FIG. 5 is an explanatory diagram of display position differences due to pitch displacement or perpendicular displacement as examples. xyz show a coordinate system fixed to the automobile provided with the HUD. z directions are traveling directions of the automobile and x directions and y directions are orthogonal to the z directions and orthogonal to each other. When the y directions coincide with the vertical directions, the x directions are horizontal directions and the y directions are perpendicular directions or upward and downward directions. When the automobile is in an attitude such that the y directions do not coincide with the vertical directions, the x directions and the y directions do not coincide with the horizontal and perpendicular directions, however, for convenience, hereinafter, the x directions are also referred to as horizontal directions and the y directions are also referred to as perpendicular directions or upward and downward directions. The directions of arrows in the drawing are positive directions and, when it is necessary to clearly show positive and negative directions, +x direction, −x direction, etc. are used.

The top part of FIG. 5 shows a state without a position difference between a virtual object 21 and a real object 11. The real object 11 is an object existing in the real space and tracked in the AR view. For example, the car ahead 10 or the like in the lower part of FIG. 2 is the real object. A projection unit 36 of the HUD projects a virtual image on a windshield 35 and the virtual object 21 within the virtual image is seen from eyes 50 of a driver.

The second part of FIG. 5 shows a position difference between the virtual object 21 and the real object 11 when the windshield 35 and the projection unit 36 shift in the +y direction by WSM. A perpendicular shift WSM is generated by a pitch rotation or a perpendicular shift of the automobile 30. The pitch rotation refers to rotation around an axis parallel to the x directions and the perpendicular shift is translation in the y directions. When the display system of the HUD renders the virtual object 21, the state of the top part is assumed, however, a time elapses to the display on the HUD and, when the perpendicular shift WSM occurs within the time, the perpendicular shift WSM is not reflected on the rendering image. Accordingly, the display position of the virtual object 21 is shifted in the +y direction by the perpendicular shift WSM of the windshield 35 or the like, and the virtual object 21 is seen as being displaced in the +y direction relative to the real object 11. For example, when the automobile 30 repeats pitch motion due to irregularities of the road, the virtual object 21 is seen as been displaced to pitch upward and downward relative to the real object 11.

The third part of FIG. 5 shows a position difference between the virtual object 21 and the real object 11 when the eyes 50 of the driver shift in the +y direction by DEM. The windshield 35 does not move, but the eyes 50 shift in the +y direction relative to the windshield 35, and the display position of the virtual object 21 shifts in the −y direction. Accordingly, the virtual object 21 is seen as being displaced in the −y direction relative to the real object 11.

The bottom part of FIG. 5 shows a position difference between the virtual object 21 and the real object 11 when the real object 11 shifts in the −y direction by RJM. The windshield 35 and the eyes 50 do not move and the display position of the virtual object 21 does not shift, however, the real object 11 shifts in the −y direction and the virtual object 21 is seen as being displaced in the +y direction relative to the real object 11.

Figure 6:
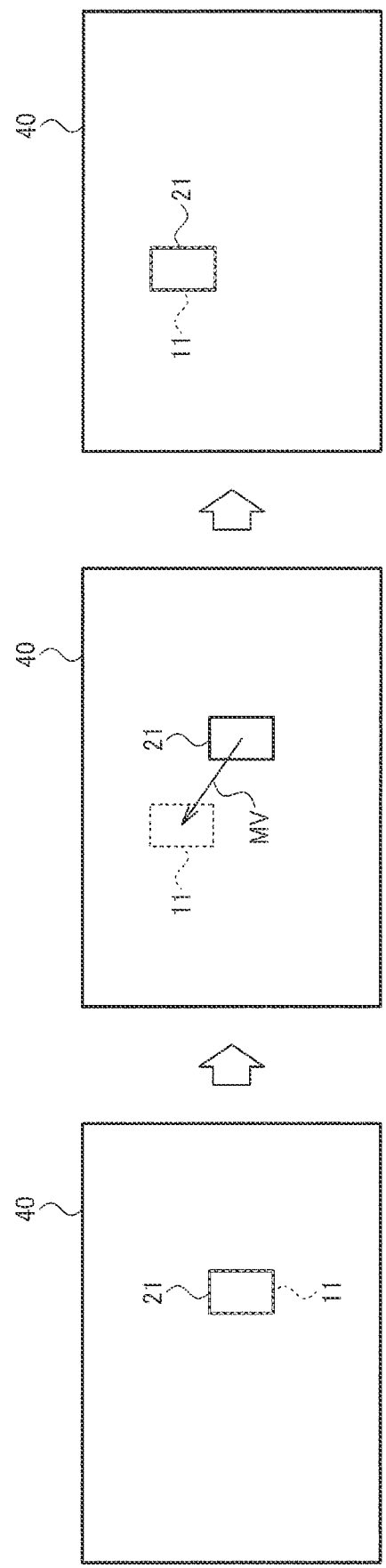
FIG. 6 is a diagram for explanation of latency compensation.

FIG. 6 is a diagram for explanation of the latency compensation of the embodiment. In FIG. 6, the real object 11 and the virtual object 21 seen from the driver are shown. The left part of FIG. 6 shows a state in which the display positions of the real object 11 and the virtual object 21 coincide as seen from the driver. As shown in the middle part of FIG. 6, when the driver moves the head to the upper left, the real object 11 shifts to the upper left by MV. The display position of the virtual object 21 does not change, and the real object 11 is displaced relative to the virtual object 21 by MV. As shown in the right part of FIG. 6, in the embodiment, a shift amount MV by latency is compensated and the display positions of the real object 11 and the virtual object 21 coincide. The latency compensation is performed, and thereby, when the driver moves the head to the upper left, the state in the left part transitions to the state in the right part and the state with the position difference as in the middle part may be avoided. The details will be described later. In the embodiment, the latency compensation is performed in warp processing as close to the display time as possible, and thereby, the position difference due to latency may be made as small as possible.

For consideration of latency in the display system of the HUD, a typical display system in related art and latency generated in the display system will be explained.

Figure 7:
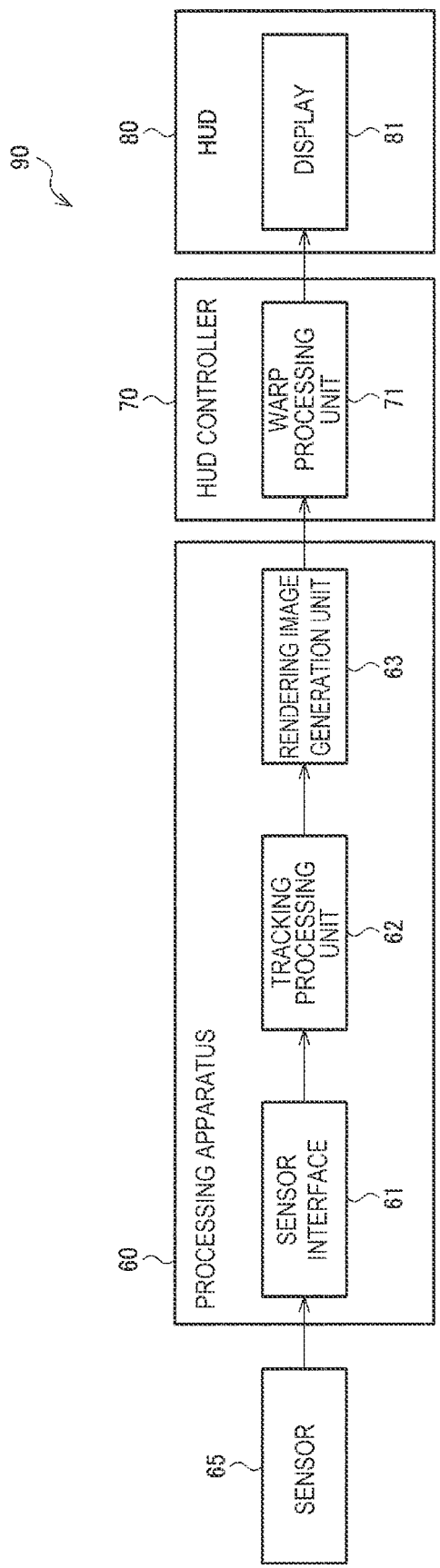
FIG. 7 shows a configuration example of a display system in related art.

FIG. 7 shows a configuration example of a display system 90 in related art. The display system 90 includes a sensor 65, a processing apparatus 60, an HUD controller 70, and an HUD 80.

The sensor 65 is a sensor that detects a position, an attitude, or motion of an automobile, a driver, or a real object.

The processing apparatus 60 includes a sensor interface 61, a tracking processing unit 62, and a rendering image generation unit 63. The sensor interface 61 is an interface circuit that receives an output signal of the sensor 65. The tracking processing unit 62 includes a CPU and tracks the position, the attitude, or the motion of the automobile, the driver, or the real object based on the output signal of the sensor 65. The rendering image generation unit 63 includes a GPU and renders a virtual object to be displayed to track the real object based on tracking information of the automobile, the driver, or the real object.

The HUD controller 70 includes a warp processing unit 71 that warp-processes the rendering image. The HUD 80 includes a display 81 that displays the image after warp processing. The display 81 is a display device such as a liquid crystal display device. The image displayed on the display 81 is projected on a windshield by an optical system, and thereby, the virtual object of the rendering image is displayed.

Figure 8:
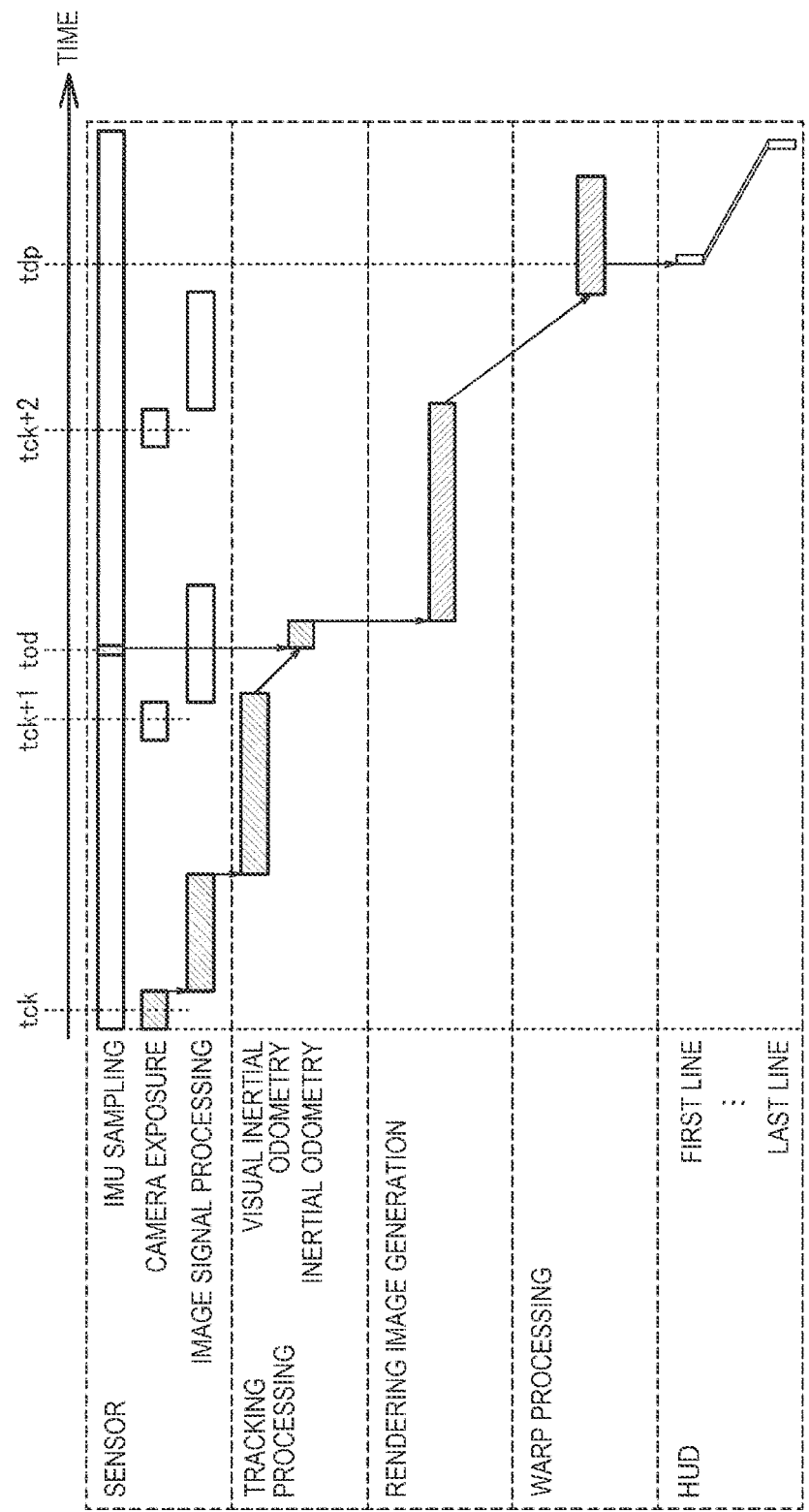
FIG. 8 shows a processing flow of the display system in related art.

FIG. 8 shows a processing flow of the display system 90. Here, an example using an IMU and a camera as the sensor 65 is shown. The IMU performs sensing at a sampling rate sufficiently faster than the frame rate of the camera. tck, tck+1, tck+2 show exposure times of the camera. That is, an image obtained by the camera shows a position of the real object at the time Tck or the like. Image signal processing is processing performed after the end of the camera exposure, which reads out a signal from an image sensor, and which includes a development process, etc.

The tracking processing unit 62 tracks the position of the real object from the image after the image signal processing by visual inertial odometry. At this stage, the position of the real object at the exposure time tck of the camera is detected. The tracking processing unit tracks the position of the real object by inertial odometry based on an output signal of the IMU at a time tod after the visual inertial odometry ends and a result of the visual inertial odometry. Through the processing, latency from the exposure time tck of the camera to the time tod of the inertial odometry is compensated and the position of the real object at the time tod is detected.

The rendering image generation unit 63 renders the virtual object in the position corresponding to the real object detected by the inertial odometry and outputs the rendering image to the warp processing unit 71. In this regard, a data communication time from the GPU forming the rendering image generation unit 63 to the HUD controller 70 is generated. The warp processing unit 71 performs warp processing on the rendering image and the image after the warp processing is displayed on the HUD 80. The first line to the last line are horizontal scanning lines of the display 81 and scanned one by one. Accordingly, a time to scan the first line to the last line is necessary for image display for one frame and, here, a time to display the first line is representatively referred to as "display time tdp".

The virtual object displayed on the HUD 80 corresponds to the position of the real object at the time tod. Accordingly, there is latency from the time tod to the display time tdp and a difference may be generated between the real object and the virtual object depending on the motion of the automobile, the driver, or the real object in this period.

As described above, there is a problem that a display position difference is generated due to the latency from the time when the tracking information is detected to the display time tdp by display of the virtual object rendered using the tracking information detected before the display time tdp. It is desirable to correct the display position difference at a time as close to HUD display as possible. As described above, in JP-A-2020-050328 to JP-A-2017-94882, there is a problem that the processing time from the correction of the position difference to the output on the head-up display is longer and the correction of the position difference is insufficient.

Figure 9:
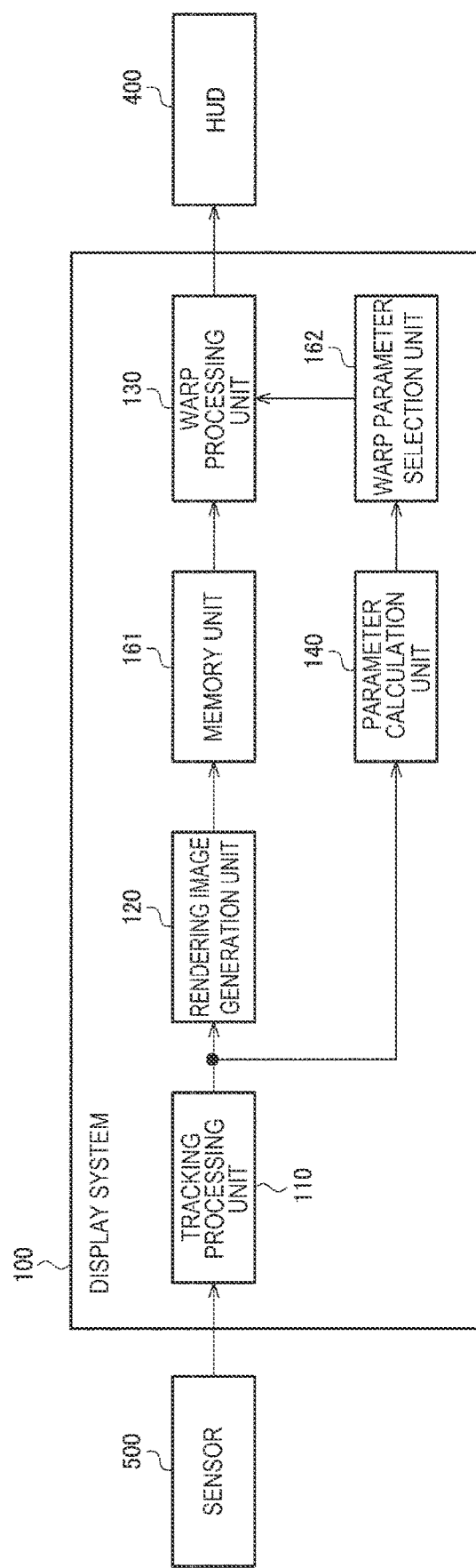
FIG. 9 shows a configuration example of a display system in an embodiment.

FIG. 9 shows a configuration example of a display system 100 in the embodiment. The display system 100 displays a virtual object corresponding to a real object on the HUD 400 based on an output signal of a sensor 500. The display system 100 includes a tracking processing unit 110, a rendering image generation unit 120, the warp processing unit 130, a parameter calculation unit 140, the memory unit 161, and the warp parameter selection unit 162.

Note that the circuit apparatus 160 is not shown in FIG. 9, however, the display system 100 includes a circuit block contained in the circuit apparatus 160. A hardware configuration example of the display system 100 including the circuit apparatus 160 will be described later. Further, FIG. 9 shows an example in which the first configuration example of the circuit apparatus 160 in FIG. is incorporated in the display system 100. When the second configuration example of the circuit apparatus 160 in FIG. 3 is incorporated in the display system 100, the layer selection unit 163 is provided in place of the warp parameter selection unit 162.

The sensor 500 is a sensor that detects a position, an attitude, or motion of a vehicle, a viewer, or a real object. The sensor 500 is provided in the vehicle and includes e.g. a Lidar, an IMU, a camera, an eye-tracking sensor, or a head-tracking sensor. The Lidar is an abbreviation for Light Detection and Ranging and a sensor that acquires three-dimensional information such as a z-map. The IMU is an abbreviation for Inertial Measurement Unit and a sensor that detects uniaxial or multiaxial motion. The IMU includes e.g. an acceleration sensor, a gyro sensor, or a combination of the sensors. The camera is a sensor that captures an image as two-dimensional information. The eye-tracking sensor is a sensor that detects a position of the eye of the viewer, a sight direction, or both. The head-tracking sensor is a sensor that detects a position of the head of the viewer, an attitude, or both.

The vehicle is an object moving within the real space with the HUD 400, the viewer, and the sensor 500 held therein, e.g. an automobile, two wheels, aircrafts, vessels, or the like. The viewer is a user viewing a virtual image projected on the HUD 400 and an operator or a passenger of the vehicle. The real object is an object existing within the real space. The real object may be an object varied in position or attitude in the HUD display area seen from the viewer when the position or the attitude of the vehicle, the viewer, or the real object varies.

The tracking processing unit 110 tracks the position, the attitude, or the motion of the vehicle, the viewer, or the real object based on the output signal of the sensor 500 and outputs the result as tracking information. For example, the tracking processing unit 110 tracks the real object based on two-dimensional ranging information from the Lidar or two-dimensional images from the camera. Or, the tracking processing unit 110 tracks the automobile based on acceleration or angular velocity information from the IMU. Or, the tracking processing unit 110 tracks the eye of the driver based on the position of the eye or information of the sight direction from the eye-tracking sensor.

The tracking information may be in any format as long as the information represents the position, the attitude, or the motion of the vehicle, the viewer, or the real object. For example, the tracking information includes coordinates indicating the position in the real space, an angle indicating the attitude, a vector indicating translation, or an angular velocity indicating rotation. Or, the tracking information may be information obtained by conversion of coordinates etc. in the real space into coordinates, an angle, a vector, an angular velocity, or the like on the image. The tracking information includes first tracking information on the vehicle, second tracking information on the viewer, and third tracking information on the real object. Note that the tracking information may include at least one piece of the first to third tracking information and, e.g. the second tracking information on the viewer may be omitted.

The rendering image generation unit 120 renders the virtual object based on the tracking information on the vehicle, the viewer, or the real object, and outputs a rendering image containing the virtual object. Specifically, the rendering image generation unit 120 obtains a position in which the real object is seen in the display area of the HUD 400 and renders the virtual object in a position corresponding to the position of the real object. Further, the rendering image generation unit 120 renders the second view object for the fixed view in addition to the virtual object as the first view object.

The parameter calculation unit 140 obtains a latency compensation parameter based on the tracking information, corrects the warp parameter used for distortion correction based on the latency compensation parameter, and outputs the corrected warp parameter. The corrected warp parameter is a first warp parameter. The parameter calculation unit 140 outputs the warp parameter used for distortion correction as a second warp parameter. The tracking information used here is sampled after the tracking information used for the rendering processing. In order to minimize latency, it is desirable to use tracking information acquired just before parameter calculation or at a time as close to the calculation as possible.

The latency compensation parameter is a parameter for compensation for a difference between the position of the virtual object in the rendering image and the position of the virtual object at the display time. The latency compensation parameter shows a shift amount or a rotation angle on the image data. More specifically, the latency compensation parameter shows a shift amount or a rotation angle in the image without distortion before warp processing.

The first warp parameter and the second warp parameter are coordinate transform parameters in the warp processing and correlate coordinates of an input image with coordinates of an output image in the warp processing. The warp parameter is e.g. a matrix or a table showing coordinate transform between the input image and the output image.

The warp processing unit 130 performs the warp processing described in FIGS. 1 to 4 on the rendering image and generates the display image. The display image is an image displayed on the display panel of the HUD 400 and the display image displayed on the display panel is projected on the screen by the projection unit, and thereby, the real space and the virtual image superimposed thereon are seen from the viewer viewing the screen.

The HUD 400 includes the projection unit for projecting the virtual image on the screen. The projection unit includes a display panel that displays the display image and an optical system that projects the display image displayed on the display panel as the virtual image on the screen. The screen is a window screen of the vehicle or the like. Or, the HUD 400 may include a dedicated screen and the virtual image may be projected on the screen. The optical system includes a mirror and a lens.

Figure 10:
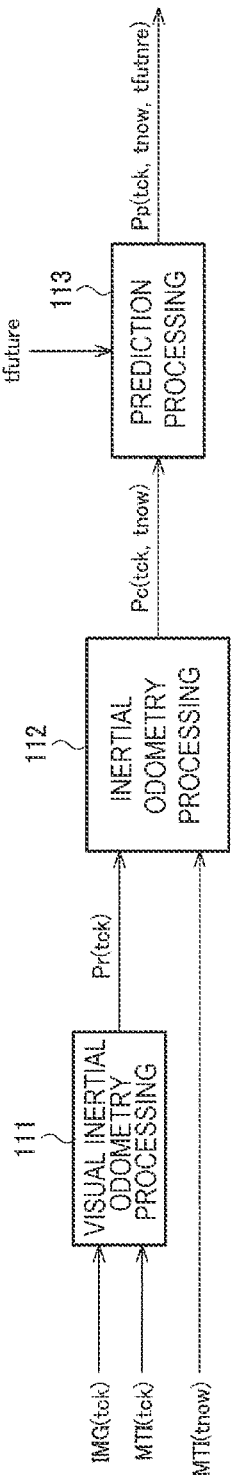
FIG. 10 shows a detailed processing flow of a tracking processing unit.
Figure 11:
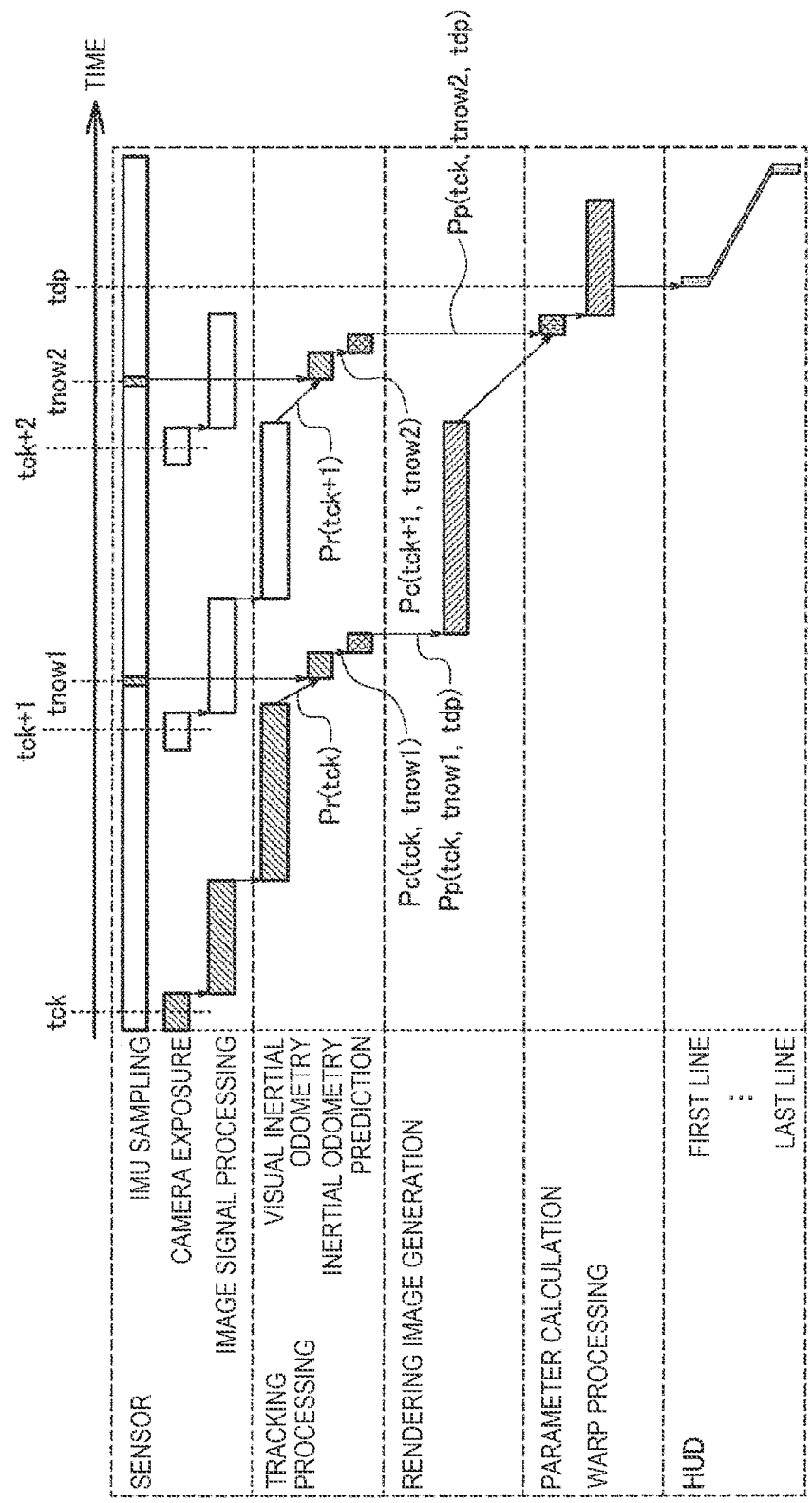
FIG. 11 shows a processing flow of the display system.

FIG. 10 shows a detailed processing flow of the tracking processing unit 110, and FIG. 11 shows a processing flow of the display system 100. Note that the tracking processing shown in FIG. 10 is an example and a method of tracking the real object or the like is not limited to that. Further, the sensor used for the tracking processing may be chosen according to the employed method.

The operation of the sensor shown in FIG. 11 is as described in FIG. 8. The tracking processing unit 110 performs visual inertial odometry processing 111 based on an image IMG (tck) captured by the camera at the time tck and motion information MTI (tck) of the vehicle sampled by the IMU at the time tck, and estimates positions and attitudes Pr (tck) of the real object and the vehicle at the time tck.

The tracking processing unit 110 performs inertial odometry processing 112 based on the positions and attitudes Pr (tck) and motion information MTI (tnow1) of the vehicle sampled by the IMU at a time tnow1, and estimates positions and attitudes Pc (tck, tnow1) of the real object and the vehicle at the time tnow1. tnow1 is after tck and before the start of the inertial odometry processing 112. More desirably, tnow1 is after the end of the visual inertial odometry processing 111 and before the start of the inertial odometry processing 112.

The tracking processing unit 110 performs prediction processing 113 based on the positions and attitudes Pc (tck, tnow1), and predicts positions and attitudes Pp (tck, tnow1, tfuture) of the real object and the vehicle at a time tfuture after tnow1. In FIG. 11, an example of prediction of the positions and attitudes Pp (tck, tnow1, tdp) for tfuture=tdp is shown. tdp is the display time of HUD. The prediction processing 113 predicts the positions and attitudes Pp in the future based on e.g. differential values of the positions and attitudes Pc obtained in chronological order.

The rendering image generation unit 120 renders the virtual object based on the positions and attitudes Pp (tck, tnow1, tdp) and outputs a rendering image. If this rendering image is displayed on the HUD 400 without change, the virtual object is displayed to correspond to the position of the real object shown by the positions and attitudes Pp.

Here, the predicted positions and attitudes Pp (tck, tnow1, tdp) are predicted using information at tck and tnow1, and not positions based on real sensor output at tdp. That is, when the real motion generated between tnow1 and tdp is different from the motion predicted by the prediction processing 113, a position difference due to latency may be generated between the virtual object and the real object. That is, the latency to be compensated in the example of FIG. 11 is latency due to the processing time between tnow1 and tdp. Note that the latency to be compensated is not limited to that. For example, when the inertial odometry and the prediction processing are omitted and the rendering processing is performed using Pr (tck), latency due to the processing time between tck and tdp is compensated.

In the embodiment, the position difference due to the latency is compensated in the following manner. The tracking processing unit 110 performs the visual inertial odometry processing 111 based on an image IMG (tck+1) captured by the camera at the time tck+1 and motion information MTI (tck+1) of the vehicle sampled by the IMU at the time tck+1, and estimates positions and attitudes Pr (tck+1) of the real object and the vehicle at the time tck+1. tck+1 is a camera exposure time next to tck.

The tracking processing unit 110 performs the inertial odometry processing 112 based on the positions and attitudes Pr (tck+1) and motion information MTI (tnow2) of the vehicle sampled by the IMU at a time tnow2, and estimates positions and attitudes Pc (tck+1, tnow2) of the real object and the vehicle at the time tnow2.

The tracking processing unit 110 performs the prediction processing 113 based on the positions and attitudes Pc (tck+1, tnow2), and predicts positions and attitudes Pp (tck+1, tnow2, tdp) of the real object and the vehicle at tdp.

The parameter calculation unit 140 obtains a latency compensation parameter based on the positions and attitudes Pp (tck, tnow1, tdp) and the positions and attitudes Pp (tck+1, tnow2, tdp). Specifically, the parameter calculation unit 140 obtains a latency compensation parameter to cancel out a position difference of the virtual object due to a difference between the positions and attitudes Pp (tck, tnow1, tdp) and the positions and attitudes Pp (tck+1, tnow2, tdp). The parameter calculation unit 140 corrects the warp parameter using the latency compensation parameter and outputs the corrected warp parameter.

The warp processing unit 130 warp-processes the rendering image using the corrected warp parameter and generates a display image. Note that the corrected warp parameter corresponds to the first warp parameter described in FIGS. 1 to 4 and the warp processing using the corrected warp parameter corresponds to the warp processing including distortion correction and vibration correction. The warp processing is executed on the second area containing the virtual object of the rendering image as the warp object image. The warp processing unit 130 executes warp processing of only distortion correction on the first area of the rendering image.

The warp processing unit 130 sequentially performs warp processing from the first line to the last line according to the scanning times from the first line to the last line in the display panel of the HUD 400, and sequentially outputs data of the respective lines after the warp processing to the HUD 400 according to the scanning times. In FIG. 8, the display time of the first line is tdp, however, tdp may be any time in a frame period for display from the first line to the last line.

In the above described embodiment, the display system 100 is the display system of the HUD 400 that displays the first view object 20 corresponding to the real object in the real space and the second view object 25 in the display area 40. The display system 100 includes the memory unit 161 and the warp processing unit 130. The memory unit 161 stores the warp object image WTIM containing the image IM20 of the first view object and the image IM25 of the second view object. The warp processing unit 130 performs the warp processing on the warp object image WTIM and generates the display image DSIM displayed in the display area 40. The warp processing unit 130 performs the warp processing on the image IM20 of the first view object of the warp object image WTIM based on the first warp parameter PRM1. The first warp parameter PRM1 is the warp parameter for vibration correction of the display position difference of the first view object 20 relative to the real object and distortion correction according to the curvature of the display area 40 and/or distortion in an optical system. Further, the warp processing unit 130 performs the warp processing on the image IM25 of the second view object of the warp object image WTIM based on the second warp parameter PRM2. The second warp parameter PRM2 is the warp parameter for distortion correction.

Further, in the embodiment, the display system 100 includes the parameter calculation unit 140 that calculates the first warp parameter PRM1 and the second warp parameter PRM2. The parameter calculation unit 140 calculates the first warp parameter PRM1 based on the tracking information. The tracking information is at least one piece of the first tracking information on the vehicle provided with the HUD 400, the second tracking information on the viewer of the HUD 400, and the third tracking information on the real object.

According to the configuration, the parameter calculation unit 140 can calculate the parameter for vibration correction based on the tracking information. Thereby, the parameter calculation unit 140 may calculate the first warp parameter PRM1 based on the parameter for vibration correction and output the first warp parameter PRM1 for vibration correction and distortion correction to the warp processing unit 130.

In the embodiment, the display system 100 includes the rendering image generation unit 120 that renders the warp object image WTIM. The parameter calculation unit 140 calculates the latency compensation parameter based on the tracking information and obtains the first warp parameter PRM1 using the latency compensation parameter as the parameter for vibration correction. The latency compensation parameter is the parameter for compensation of latency including rendering processing latency of the warp object image WTIM.

According to the configuration, latency compensation may be performed by the vibration correction. That is, the position difference of the virtual object generated due to latency caused by the rendering processing between tnow1 and tdp or the like may be compensated based on the latency compensation parameter. The latency compensation is performed in the warp processing performed immediately before display, and thereby, the residual latency may be minimized and the AR view with higher trackability of the virtual object to the real object may be realized.

In the embodiment, the rendering image generation unit 120 generates the rendering image based on the tracking information at a first time. The parameter calculation unit 140 calculates the latency compensation parameter based on the tracking information at a second time after the first time and before the image display time tdp and the tracking information at the first time. In the example of FIG. 8, tnow1 corresponds to the first time and tnow2 corresponds to the second time.

According to the configuration, the latency between the first time and the display time is shortened to the latency between the second time and the display time, and thereby, the position difference due to latency is reduced. In the explanation using the example of FIG. 8, the latency compensation parameter for correction of the warp parameter reflects the motion information sampled by the IMU at tnow2 after tnow1. The display position of the virtual object is corrected by the latency compensation parameter, and thereby, the latency between tnow1 and tdp is shortened to the latency between tnow2 and tdp. The warp processing is the processing performed immediately before the HUD display and tnow2 is close to tdp, and the latency may be made as small as possible and the display position difference of the virtual object due to latency may be made smaller.

In the embodiment, the parameter calculation unit 140 corrects the warp parameter for coordinate transform according to the curvature of the display area based on the latency compensation parameter, and thereby, outputs the first warp parameter. The warp processing unit 130 performs the warp processing using the first warp parameter on the first area AR1 of the warp object image WTIM, and thereby, performs the latency compensation processing.

As described above, the warp processing is performed using the first warp parameter based on the latency compensation parameter, and thereby, the latency compensation may be performed in the warp processing. For example, a configuration in which the image processing for latency compensation is separately performed from the warp processing may be considered, however, the processing load is heavier by the image processing of the latency compensation and the latency of the warp processing remains because of the warp processing performed after the latency compensation. In the embodiment, the latency compensation and the warp processing are integrated, and thereby, the latency may be minimized with suppressed increase of the processing load.

4. Detailed Configuration Example of Display System

As below, the hardware configuration example of the display system 100 will be explained, however, the hardware configuration of the display system 100 is not limited to that. For example, in the following configuration, the parameter calculation unit 140 is provided in a processing apparatus 150, however, the parameter calculation unit 140 may be provided in the circuit apparatus 160. Further, in the following configuration, the circuit apparatus 160 includes the warp parameter selection unit 162, however, when the second configuration example in FIG. 3 is employed, the circuit apparatus 160 may include the layer selection unit 163 in place of the warp parameter selection unit 162.

Figure 12:
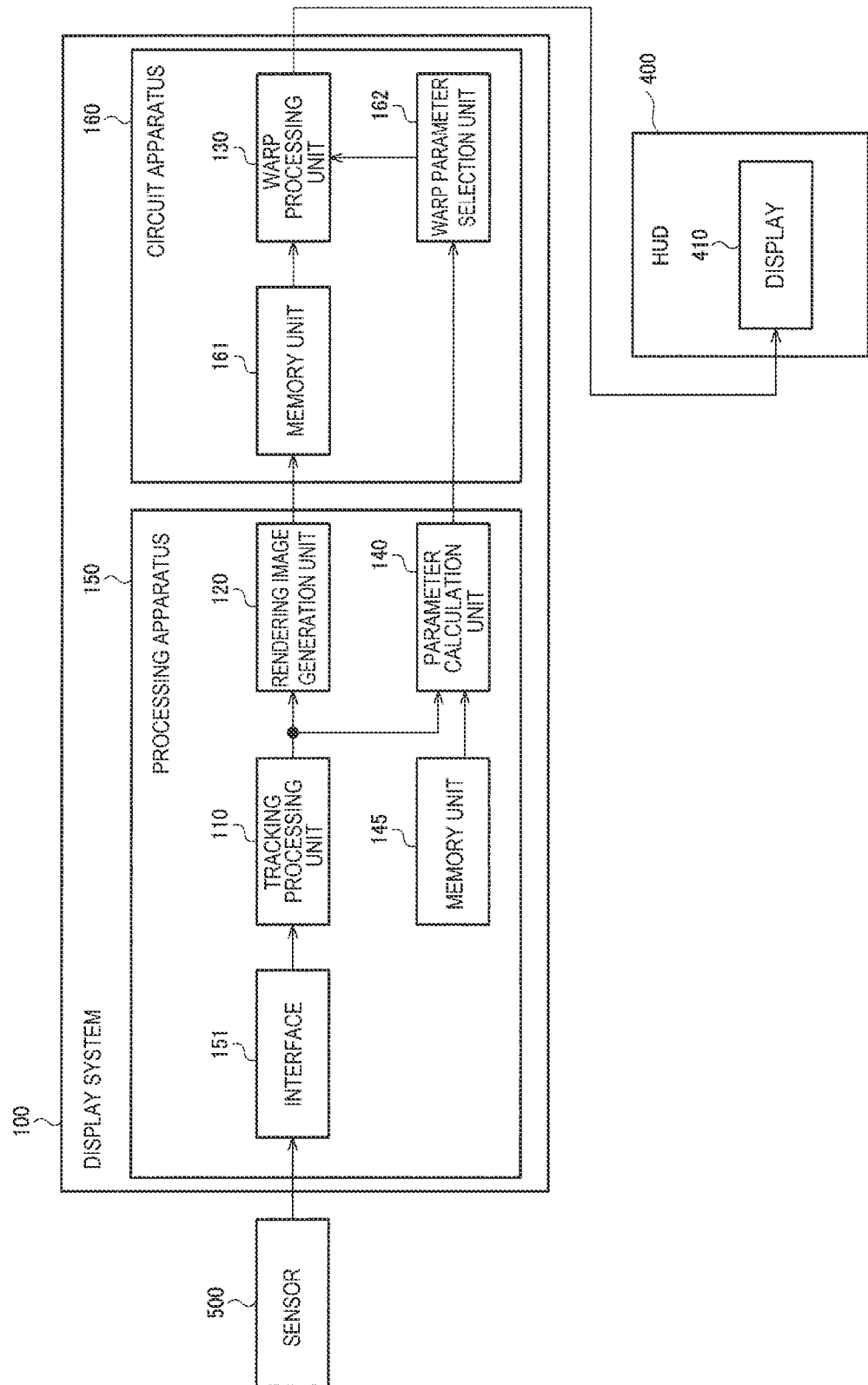
FIG. 12 shows a detailed configuration example of the display system.

FIG. 12 shows a detailed configuration example of the display system 100. The display system 100 includes the processing apparatus 150 and the circuit apparatus 160. The processing apparatus 150 includes e.g. an SoC containing an interface 151, the tracking processing unit 110, the rendering image generation unit 120, the parameter calculation unit 140, and a memory unit 145. SoC is an abbreviation for System on Chip. The circuit apparatus 160 includes the memory unit 161, the warp processing unit 130, and the warp parameter selection unit 162. Note that the component elements already described have the same signs and the explanation of the component elements will be appropriately omitted.

The interface 151 is an interface for inputting the output signal of the sensor 500 to the processing apparatus 150. The interface 151 is e.g. a receiver circuit that receives the output signal of the sensor 500. Or, the interface 151 may be a terminal to which the output signal of the sensor 500 is input. In this case, the output signal of the sensor 500 input to the terminal is input to a processor forming the tracking processing unit 110 and the processor receives and processes the output signal of the sensor 500.

The tracking processing unit 110 performs tracking processing based on the output signal of the sensor 500. The rendering image generation unit 120 renders the virtual object based on the tracking information output by the tracking processing unit 110. The tracking processing unit 110 and the rendering image generation unit 120 include a processor such as a CPU or a GPU. CPU is an abbreviation for Central Processing Unit. GPU is an abbreviation for Graphical Processing Unit. The tracking processing unit 110 and the rendering image generation unit 120 may be realized by a single processor or respectively realized by individual processors.

The memory unit 145 is a semiconductor memory such as a RAM or nonvolatile memory and stores a warp parameter before latency compensation. RAM is an abbreviation for Random Access Memory. As described above, the warp parameter is a matrix or a table. The warp parameter may be a forward map parameter or an inverse map parameter. The forward map parameter is a parameter that correlates the respective pixels of the input image with movement destination coordinates corresponding to the respective pixels or a parameter that correlates the respective pixels of the input image with relative movement amounts to the movement destination coordinates corresponding to the respective pixels. The inverse map parameter is a parameter that correlates the respective pixels of the output image with reference source coordinates corresponding to the respective pixels or a parameter that correlates the respective pixels of the output image with relative movement amounts from the reference source coordinates corresponding to the respective pixels.

The parameter calculation unit 140 obtains a latency compensation parameter based on the tracking information, corrects the warp parameter read out from the memory unit 145 based on the latency compensation parameter, and outputs the corrected warp parameter as the first warp parameter. Further, the parameter calculation unit 140 outputs the warp parameter read out from the memory unit 145 as the second warp parameter. The parameter calculation unit 140 may be realized by the same processor as the processor of the tracking processing unit 110 and the rendering image generation unit 120 or may be realized by another processor.

The warp processing unit 130 generates a display image by warp processing of the rendering image using the first warp parameter and the second warp parameter. Here, the rendering image corresponds to the warp object image. The warp processing unit 130 includes a logic circuit e.g. a gate array automatically placed and routed, a standard cell array automatically routed, or the like. The HUD 400 includes a display 410 and displays the display image on the display 410. The display 410 is a display device such as a liquid crystal display device. The HUD 400 includes a projection optical unit (not shown). The projection optical unit projects the image displayed on the display 410 on the screen, and thereby, superimposes and displays the virtual object on the real space.

5. Warp Processing

As below, the details of the warp processing will be explained with inverse warp as an example. Note that the warp processing may be forward warp or inverse warp, and the warp processing unit 130 may be a forward warp engine or an inverse warp engine.

FIG. 13 is an explanatory diagram of the warp processing in the embodiment. The input image is a rendering image. The output image is a display image displayed on a liquid crystal panel or the like of the HUD. (xsrc,ysrc) show a position in the horizontal directions and a position in the perpendicular directions in the input image. (xdst,ydst) show a position in the horizontal directions and a position in the perpendicular directions in the output image.

When correction of the warp parameter using the latency compensation parameter is expressed by g( ), a position in a latency-compensated image is expressed by the following expression (1).

$$(xlat,ylat)=g(xsrc,ysrc) \quad (1)$$

When distortion correction using the warp parameter according to the curvature of the screen is expressed by f( ), a position in the output image is expressed by the following expression (2).

$$(xdst,ydst)=f(xlat,ylat) \quad (2)$$

From the above expressions (1) and (2), coordinate transform between the input image and the output image is expressed by the following expression (3).

$$(xdst,ydst)=f \cdot g(xsrc,ysrc) \quad (3)$$

The inverse warp uses inverse transform of the expression (3) and is expressed by the following expression (4).

$$(xsrc,ysrc)=g^{-1} \cdot f^{-1}(xdst,ydst) \quad (4)$$

In the embodiment, the parameter calculation unit 140 obtains the latency compensation parameter $g^{-1}$, calculates $g^{-1} \cdot f^{-1}$ and corrects the warp parameter $f^{-1}$, and outputs the corrected warp parameter $g^{-1} \cdot f^{-1}$. The warp processing unit 130 generates the output image by the warp processing of the expression (4) using the corrected warp parameter $g^{-1} \cdot f^{-1}$.

Note that an object of the warp processing using the corrected warp parameter $g^{-1} \cdot f^{-1}$ is the first area AR1 explained in FIGS. 1 to 4 and warp processing using the warp parameter $f^{-1}$ is performed on the second area AR2. That is, the corrected warp parameter $g^{-1} \cdot f^{-1}$ is the first warp parameter and the warp parameter $f^{-1}$ is the second warp parameter.

FIG. 14 shows correlations between tracking information of the vehicle or the like and latency compensation based on the tracking information. Here, six-axis motion information is obtained as the tracking information.

Yaw displacement $\Delta\alpha$ is rotation displacement around an axis parallel to the y directions as the perpendicular directions as a rotation axis. The yaw displacement $\Delta\alpha$ produces a horizontal shift of the real object viewed by the viewer through the screen. The horizontal shift is a shift in the x directions as the horizontal directions. Accordingly, the method of latency compensation is horizontal shifting.

Pitch displacement $\Delta\beta$ is rotation displacement around an axis parallel to the x directions as the horizontal directions as a rotation axis. The pitch displacement $\Delta\beta$ produces a perpendicular shift of the real object viewed by the viewer through the screen. The perpendicular shift is a shift in the y directions as the perpendicular directions. Accordingly, the method of latency compensation is perpendicular shifting.

Roll displacement $\Delta\gamma$ is rotation displacement around an axis parallel to the z directions as anterior or posterior direction of the vehicle as a rotation axis. The roll displacement $\Delta\gamma$ produces a rotation of the real object viewed by the viewer through the screen. Accordingly, the method of latency compensation is rotating.

A horizontal shift $\Delta x$ is a shift in the x directions and produces a horizontal shift of the real object viewed by the viewer through the screen. Accordingly, the method of latency compensation is horizontal shifting.

A perpendicular shift $\Delta y$ is a shift in the y directions and produces a perpendicular shift of the real object viewed by the viewer through the screen. Accordingly, the method of latency compensation is perpendicular shifting.

An anterior or posterior shift $\Delta z$ is a shift in the z directions and produces reduction or enlargement of the real object viewed by the viewer through the screen. Accordingly, the method of latency compensation is reducing or zooming.

FIG. 15 shows examples of the latency compensation parameters realizing the above described compensation methods. A matrix on the right side of the expression shown in FIG. 15 corresponds to $g^{-1}$ explained in FIG. 13. m13 shows a horizontal shift and m23 shows a perpendicular shift. m12 shows horizontal skew. The horizontal skew is transform to distort a rectangle to a parallelogram, however, used as an approximation of rotation here. m11 shows a horizontal scale and m22 shows a perpendicular scale. m11 and m22 correspond to reduction or zoom.

For example, when a case where only a perpendicular shift occurs is considered, m11=m22=1, m12=m13=0. Here, the expression in FIG. 15 is the following expression.

$$(xsrc,ysrc)=(xlat,ylat+m23) \quad (5)$$

In FIG. 13, the inverse transform $f^{-1}( )$ of the distortion correction moves (xdst,ydst) to (xlat,ylat). The expression (5) corresponds to shifting of the movement amount in the perpendicular direction by m23 and latency compensation is realized by the shifting.

Figure 16:
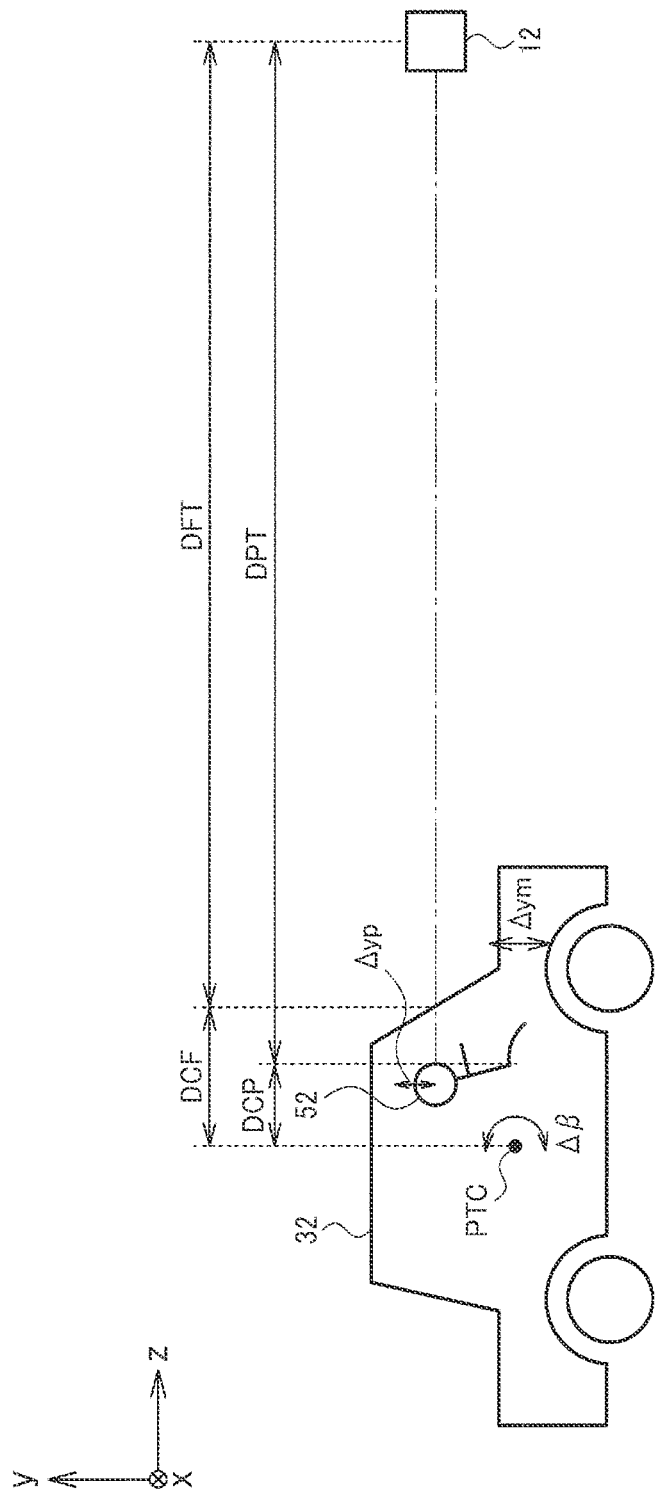
FIG. 16 is a diagram for explanation of a method of calculating latency compensation parameters from tracking information.

FIG. 16 is a diagram for explanation of a method of calculating the latency compensation parameter from the tracking information.

Displacement generated in the vehicle, the viewer, or the real object may be converted into a shift amount or a rotation angle on the screen from a geometrical position relationship among the rotation centers of yaw, roll, pitch, the head of the viewer, the HUD screen, and the real object. Then, the matrix on the right side in FIG. 15 may be determined from the shift amount or the rotation angle.

In FIG. 16, the method of calculating the latency compensation parameter from the tracking information will be explained using m23 showing the perpendicular shift in FIG. 15 as an example. Here, an example using pitch displacement $\Delta\beta$ and a perpendicular shift $\Delta ym$ of a vehicle and a perpendicular shift $\Delta yp$ of a viewer 52 as the tracking information is explained.

When a distance between a rotation center PTC of pitch and a screen 34 is DCF, the pitch displacement $\Delta\beta$ of the vehicle 32 perpendicularly shifts the screen 34 by $DCF \times \Delta\beta$. Further, the perpendicular shift $\Delta ym$ of the vehicle 32 perpendicularly shifts the screen 34 by $\Delta ym$. As a total of the shifts, a perpendicular shift amount of the screen 34 is $DCF \times \Delta\beta + \Delta ym$. If the head of the viewer 52 and a real object 12 do not move, for example, when the screen 34 moves upward by $+(DCF \times \Delta\beta + \Delta ym)$, the position of the real object 12 on the screen 34 viewed from the viewer is seen as being lower by $-(DCF \times \Delta\beta + \Delta ym)$ relatively with respect to the screen 34. Therefore, the latency compensation parameter in this case is $m23=-(DCF \times \Delta\beta + \Delta ym)$.

Here, a distance between the head of the viewer 52 and the real object 12 is DPT and a distance between the screen 34 and the real object 12 is DFT. If the screen 34 and the real object 12 do not move, for example, when the viewer moves upward by +Δyp, the position of the real object 12 on the screen 34 viewed from the viewer 52 is seen as being higher by +(DFT/DPT)×Δyp relatively with respect to the screen 34. If the real object 12 is located sufficiently far, DFT/DPT=1 may be approximated and the perpendicular shift amount of the real object 12 is Δyp. Therefore, the latency compensation parameter in this case is m23=Δyp.

In the above described embodiment, the display system 100 includes the memory unit 145, and the memory unit 145 stores the table correlating the coordinates in the display image with the movement amounts showing the movement destinations of the coordinates as the warp parameter. The parameter calculation unit 140 shifts the movement amount of the table based on the latency compensation parameter and outputs the table with the shifted movement amount as the first warp parameter PRM1.

In the example of FIG. 13, $f^{-1}(\ )$ is stored as the table in the memory unit 145. In the example explained in FIG. 15 and the expression (5), the movement amount for moving (xdst,ydst) to (xlat,ylat) is shifted in the perpendicular direction by e.g. m23. That is, the table is corrected to the table for moving (xdst,ydst) to (xlat,ylat+m23).

Or, the memory unit 145 may store a parameter of a conversion expression to convert the coordinates in the display image into the coordinates of the movement destination as the warp parameter. The parameter calculation unit 140 shifts the coordinates of the movement destination based on the latency compensation parameter and outputs the parameter of the conversion expression with the shifted coordinates of the movement destination as the first warp parameter PRM1.

The conversion expression is e.g. a polynomial expression and coefficients of the polynomial expression are stored as the parameter of the conversion expression in the memory unit 145. In the example of FIG. 13, the parameter of the conversion expression showing $f^{-1}(\ )$ is stored in the memory unit 145. In the example explained in FIG. 15 and the expression (5), the movement amount for moving (xdst,ydst) to (xlat,ylat) is shifted in the perpendicular direction by e.g. m23. That is, the conversion expression is corrected to the conversion expression for moving (xdst,ydst) to (xlat,ylat+m23).

Note that the embodiment is explained in detail as described above, however, a person skilled in the art could easily understand many modifications without substantively departing from the new matter and the effects of the present disclosure. Therefore, the scope of the present disclosure includes these modified examples. For example, in the specification or the drawings, terms described with different terms in a broader sense or synonymous at least once may be replaced by the different terms in any part of the specification or the drawings. Further, the scope of the present disclosure includes all combinations of the embodiment and modified examples. Furthermore, the configurations, the operations, etc. of the sensor, the head-up display, the processing apparatus, the circuit apparatus, the display system, the electronic apparatus, the vehicle, etc. are not limited to those explained in the embodiment, but various modifications can be made.

What is claimed is:

1. A circuit apparatus used for a head-up display that displays a first view object corresponding to a real object in a real space and a second view object in a display area, comprising:
   a memory configured to store a warp object image containing an image of the first view object and an image of the second view object; and
   a warp processing circuit configured to perform warp processing on the warp object image and generate a display image displayed in the display area, wherein
   the warp processing circuit is configured to perform:
      the warp processing on the image of the first view object of the warp object image based on a first warp parameter for both vibration correction and distortion correction, wherein the vibration correction is configured to correct a display position difference of the first view object relative to the real object, and the distortion correction is configured to correct distortion due to at least one of curvature of the display area and an optical system; and
      the warp processing on the image of the second view object of the warp object image based on a second warp parameter for the distortion correction.

2. The circuit apparatus according to claim 1, further comprising:
   a warp parameter selector,
   wherein the display area includes a first area in which the first view object is displayed and a second area the second view object is displayed, and
   the warp parameter selector is configured to:
      output the first warp parameter to the warp processing circuit when the warp processing circuit performs the warp processing on the first area of the display area; and
      output the second warp parameter to the warp processing circuit when the warp processing circuit performs the warp processing on the second area of the display area.

3. The circuit apparatus according to claim 1, wherein
   the warp processing circuit is configured to:
   perform the warp processing on the warp object image based on the first warp parameter to output a first correction image;
   perform the warp processing on the warp object image based on the second warp parameter to output a second correction image; and
   synthesize the first correction image and the second correction image to output the display image.

4. The circuit apparatus according to claim 3, wherein
   the warp processing circuit is configured to:
   output the first correction image with respect to the first area of the display area; and
   output the second correction image with respect to the second area of the display area.

5. The circuit apparatus according to claim 3, wherein
   the warp processing circuit is configured to perform α blending of the first correction image and the second correction image to output the display image.

6. The circuit apparatus according to claim 1, wherein
   the memory is a line buffer.

7. A display system of a head-up display that displays a first view object corresponding to a real object in a real space and a second view object in a display area, comprising:
   a memory configured to store a warp object image containing an image of the first view object and an image of the second view object; and
   a warp processing circuit configured to perform warp processing on the warp object image and generate a display image displayed in the display area, wherein
   the warp processing circuit is configured to perform:
      the warp processing on the image of the first view object of the warp object image based on a first warp parameter for both vibration correction and distortion correction, wherein the vibration correction is configured to correct a display position difference of the first view object relative to the real object, and the distortion correction is configured to correct distortion due to at least one of curvature of the display area and an optical system; and the warp processing on the image of the second view object of the warp object image based on a second warp parameter for the distortion correction.

8. The display system according to claim 7, further comprising a processing circuit, wherein the processing circuit is configured to calculate the first warp parameter based on tracking information as at least one piece of first tracking information on a vehicle in which the head-up display is provided, second tracking information on a viewer of the head-up display, and third tracking information on the real object.

9. The display system according to claim 8, wherein the processing circuit is further configured to:
render the warp object image;
calculate a latency compensation parameter for compensation for latency including rendering processing latency of the warp object image based on the tracking information; and obtain the first warp parameter using the latency compensation parameter as a parameter for the vibration correction.

10. An image processing method for a head-up display that displays a first view object corresponding to a real object in a real space and a second view object in a display area, the image processing method comprising:

performing warp processing on a warp object image containing an image of the first view object and an image of the second view object to generate a display image displayed in the display area;

performing the warp processing on the image of the first view object of the warp object image based on a first warp parameter for both vibration correction and distortion correction, wherein the vibration correction is configured to correct a display position difference of the first view object relative to the real object, and the distortion correction is configured to correct distortion due to at least one of curvature of the display area and an optical system; and performing the warp processing on the image of the second view object of the warp object image based on a second warp parameter for the distortion correction.

* * * * *